(12) United States Patent
Luthra et al.

(10) Patent No.: US 12,058,355 B2
(45) Date of Patent: Aug. 6, 2024

(54) LOW LATENCY AND LOW DEFECT MEDIA FILE TRANSCODING USING OPTIMIZED STORAGE, RETRIEVAL, PARTITIONING, AND DELIVERY TECHNIQUES

(71) Applicant: Box, Inc., Redwood City, CA (US)

(72) Inventors: Tanooj Luthra, San Diego, CA (US); Ritik Malhotra, San Jose, CA (US); Bryan Huh, San Jose, CA (US)

(73) Assignee: Box, Inc.

(*) Notice: Subject to any disclaimer, the term of this patent is extended or adjusted under 35 U.S.C. 154(b) by 0 days.

(21) Appl. No.: 18/320,907

(22) Filed: May 19, 2023

(65) Prior Publication Data
US 2023/0289329 A1    Sep. 14, 2023

Related U.S. Application Data

(63) Continuation of application No. 15/140,357, filed on Apr. 27, 2016, now abandoned.
(Continued)

(51) Int. Cl.
*H04N 19/40* (2014.01)
*G06F 9/46* (2006.01)
(Continued)

(52) U.S. Cl.
CPC .......... *H04N 19/40* (2014.11); *G06F 9/46* (2013.01); *G06F 12/0891* (2013.01);
(Continued)

(58) Field of Classification Search
CPC ....... H04L 65/70; H04L 65/762; H04L 65/80; H04N 19/40
See application file for complete search history.

(56) References Cited

U.S. PATENT DOCUMENTS

| 4,774,654 A | 9/1988 | Pomerene et al. |
| 6,512,529 B1 | 1/2003 | Janssen |

(Continued)

OTHER PUBLICATIONS

"Data deduplication", Wikipedia, URL: https://en.wikipedia.org/wiki/Data_deduplication, Mar. 6, 2016, Accessed on Apr. 10, 2016.
(Continued)

*Primary Examiner* — George C Neurauter, Jr.
(74) *Attorney, Agent, or Firm* — Vista IP Law Group, LLP

(57) ABSTRACT

Systems, methods and computer program products for high-performance, low latency start-up of large shared media files. A method for low latency startup with low defect playback commences upon identifying a first media file having a first format to be converted to a second media file having a second format. A scheduler divides the first media file into multiple partitions separated by partition boundaries. The method continues by converting the partitions into respective converted partitions that comport with the second format. Determinations as to the position of the partition boundaries is made based on measurable conditions present at a particular moment in time. Different formats receive different treatment based on the combination of characteristics of the first format, characteristics of the second format, as well as on characteristics of measurable conditions present at the moment in time just before conversion of a segment.

20 Claims, 20 Drawing Sheets

Related U.S. Application Data

(60) Provisional application No. 62/154,658, filed on Apr. 29, 2015, provisional application No. 62/154,022, filed on Apr. 28, 2015.

(51) Int. Cl.

| | | |
|---|---|---|
| *G06F 12/0891* | (2016.01) | |
| *G06F 12/1081* | (2016.01) | |
| *G06F 12/122* | (2016.01) | |
| *G06F 16/11* | (2019.01) | |
| *G06F 16/17* | (2019.01) | |
| *G06F 16/172* | (2019.01) | |
| *G06F 16/174* | (2019.01) | |
| *G06F 16/176* | (2019.01) | |
| *G06F 16/182* | (2019.01) | |
| *G06F 16/185* | (2019.01) | |
| *G06F 16/188* | (2019.01) | |
| *G06F 16/22* | (2019.01) | |
| *G06F 16/23* | (2019.01) | |
| *G06F 16/242* | (2019.01) | |
| *G06F 16/957* | (2019.01) | |
| *H04L 9/40* | (2022.01) | |
| *H04L 65/70* | (2022.01) | |
| *H04L 65/75* | (2022.01) | |
| *H04L 65/80* | (2022.01) | |
| *H04L 67/00* | (2022.01) | |
| *H04L 67/06* | (2022.01) | |
| *H04L 67/1097* | (2022.01) | |

(52) U.S. Cl.
CPC ........ *G06F 12/1081* (2013.01); *G06F 12/122* (2013.01); *G06F 16/113* (2019.01); *G06F 16/172* (2019.01); *G06F 16/1727* (2019.01); *G06F 16/1748* (2019.01); *G06F 16/1774* (2019.01); *G06F 16/182* (2019.01); *G06F 16/183* (2019.01); *G06F 16/185* (2019.01); *G06F 16/188* (2019.01); *G06F 16/196* (2019.01); *G06F 16/22* (2019.01); *G06F 16/23* (2019.01); *G06F 16/2443* (2019.01); *G06F 16/9574* (2019.01); *H04L 63/0428* (2013.01); *H04L 65/70* (2022.05); *H04L 65/762* (2022.05); *H04L 65/80* (2013.01); *H04L 67/06* (2013.01); *H04L 67/1097* (2013.01); *H04L 67/34* (2013.01); *G06F 2212/1016* (2013.01); *G06F 2212/1044* (2013.01); *G06F 2212/154* (2013.01); *G06F 2212/463* (2013.01); *G06F 2212/60* (2013.01); *G06F 2212/657* (2013.01)

(56) References Cited

U.S. PATENT DOCUMENTS

| | | |
|---|---|---|
| 6,750,858 B1 | 6/2004 | Rosenstein |
| 7,047,309 B2 | 5/2006 | Baumann |
| 7,281,168 B1 | 10/2007 | Coates |
| 7,404,000 B2 | 7/2008 | Lolayekar |
| 7,694,065 B2 | 4/2010 | Petev |
| 7,975,018 B2 | 7/2011 | Unrau |
| 8,180,801 B2 | 5/2012 | Zhang |
| 8,489,549 B2 | 7/2013 | Guarraci |
| 8,527,549 B2 | 9/2013 | Cidon |
| 8,548,957 B2 | 10/2013 | Guarraci |
| 8,849,761 B2 | 9/2014 | Prahlad |
| 8,886,704 B2 | 11/2014 | Busey |
| 8,886,894 B2 | 11/2014 | Adi-Tabatabai |
| 9,087,066 B2 | 7/2015 | Acharya |
| 9,210,085 B2 | 12/2015 | Harrison |
| 9,253,166 B2 | 2/2016 | Gauda |
| 9,307,258 B2 * | 4/2016 | MacInnis ............... H04N 19/40 |
| 9,384,209 B2 | 7/2016 | Kim |
| 9,444,695 B2 | 9/2016 | Dutta |
| 9,544,348 B2 | 1/2017 | Devereaux |
| 9,621,613 B1 * | 4/2017 | Huang .................... H04L 67/02 |
| 9,628,268 B2 | 4/2017 | Kiang et al. |
| 9,632,814 B2 | 4/2017 | Bonilla |
| 9,715,428 B1 | 7/2017 | Morshed |
| 9,756,022 B2 | 9/2017 | Amiri et al. |
| 9,811,532 B2 | 11/2017 | Parkison et al. |
| 9,852,361 B1 | 12/2017 | Prasad |
| 9,940,241 B1 | 4/2018 | Mehrotra |
| 10,044,466 B2 * | 8/2018 | Schmidt ............. H04L 43/0864 |
| 10,097,607 B2 * | 10/2018 | Wu .................. H04N 21/23424 |
| 10,180,947 B2 * | 1/2019 | Malhotra .............. G06F 16/185 |
| 10,469,554 B2 * | 11/2019 | Brueck ............. H04N 21/8456 |
| 10,929,353 B2 * | 2/2021 | Luthra ................ G06F 16/1748 |
| 11,184,652 B2 * | 11/2021 | Gogoi ..................... H04L 65/80 |
| 11,470,131 B2 * | 10/2022 | Karande ............ G06F 16/9535 |
| 2004/0107319 A1 | 6/2004 | D'Orto |
| 2007/0076626 A1 | 4/2007 | Wise |
| 2007/0250476 A1 | 10/2007 | Krasnik |
| 2008/0098237 A1 | 4/2008 | Dung |
| 2008/0222244 A1 | 9/2008 | Huang et al. |
| 2008/0267221 A1 | 10/2008 | Ozzie |
| 2010/0250867 A1 | 9/2010 | Bettger |
| 2010/0268840 A1 | 10/2010 | Hiie |
| 2010/0332479 A1 | 12/2010 | Prahlad |
| 2011/0066668 A1 | 3/2011 | Guarraci |
| 2011/0179167 A1 | 7/2011 | Tanimoto |
| 2011/0185292 A1 | 7/2011 | Chawla |
| 2011/0320733 A1 | 12/2011 | Sanford |
| 2013/0110961 A1 | 5/2013 | Jadhav |
| 2013/0138810 A1 | 5/2013 | Binyamin |
| 2013/0238785 A1 | 9/2013 | Hawk |
| 2013/0318198 A1 | 11/2013 | Zuk |
| 2013/0339470 A1 | 12/2013 | Jeswani |
| 2014/0006354 A1 | 1/2014 | Parkison et al. |
| 2014/0019844 A1 | 1/2014 | Rakow |
| 2014/0108792 A1 | 4/2014 | Borzycki |
| 2014/0118379 A1 | 5/2014 | Hakura |
| 2014/0149591 A1 | 5/2014 | Bhattacharya |
| 2014/0149783 A1 | 5/2014 | Georgiev |
| 2014/0201141 A1 | 7/2014 | Vibhor et al. |
| 2014/0324929 A1 | 10/2014 | Mason, Jr. |
| 2014/0359465 A1 | 12/2014 | Litan Sever |
| 2014/0379647 A1 | 12/2014 | Smith |
| 2015/0039726 A1 * | 2/2015 | Hoffert ................. H04L 65/612 |
| | | 709/219 |
| 2015/0067109 A1 | 3/2015 | Tang |
| 2015/0120675 A1 | 4/2015 | Mason, Jr. et al. |
| 2015/0220561 A1 | 8/2015 | Goetz |
| 2015/0227602 A1 | 8/2015 | Ramu |
| 2015/0242436 A1 | 8/2015 | Bodin |
| 2015/0372939 A1 | 12/2015 | Redler, IV |
| 2016/0014095 A1 | 1/2016 | Strayer |
| 2016/0065364 A1 | 3/2016 | Amiri et al. |
| 2016/0103851 A1 | 4/2016 | Dimitrov |
| 2016/0323351 A1 | 4/2016 | Lurhra et al. |
| 2016/0134673 A1 * | 5/2016 | MacInnis ................ H04L 65/61 |
| | | 709/231 |
| 2016/0321287 A1 | 11/2016 | Luthra et al. |
| 2016/0321288 A1 | 11/2016 | Malhotra et al. |
| 2016/0321291 A1 | 11/2016 | Malhotra et al. |
| 2016/0321311 A1 | 11/2016 | Tallamraju et al. |
| 2016/0323358 A1 | 11/2016 | Malhotra et al. |
| 2017/0134344 A1 | 5/2017 | Wu |
| 2017/0141921 A1 | 5/2017 | Berger |

OTHER PUBLICATIONS

"REST Docs | Bitcasa Developer Center", URL: https://developer.bitcasa.com/docs/rest/, Sep. 2015, Accessed on Jan. 15, 2016.
Apache Thrift Wikipedia, URL: https://en.wikipedia.org/wiki/Apache_Thrift, Oct. 27, 2015, Accessed on Jan. 26, 2016.
Chiu, David, et al., "Elastic Cloud Caches for Accelerating Service-Oriented Computations", SC '10, New Orleans, LA, Nov. 13-19, 2010, 11 pages.

(56) References Cited

OTHER PUBLICATIONS

Chun, Byung-Gon, et al., "CloneCloud: Elastic Execution between Mobile Device and Cloud", EuroSys '11, Salzburg, Austria, Apr. 10-13, 2011, pp. 301-314.
Haining, Theodore R., et al., "Management Policies for Non-Volatile Write Caches", PCCC 1999, Scottsdale, AZ, Feb. 12, 1999, pp. 321-328.
Kim, Hwanju, et al., "XHive: Efficient Cooperative Caching for Virtual Machines", IEEE Transactions on Computers, vol. 60, No. 1, Jan. 2011, pp. 106-119.
Kim, Hyeon Gyu, et al., "Time-slide window join over data streams", Journal of Intelligent Information Streams, vol. 43, Issue 2, Oct. 2014, pp. 323-347.
Li, Jin, et al., "AdaptWID: An Adaptive, Memory-Efficient Window Aggregation Implementation", IEEE Internet Computing, vol. 12, Issue 6, Nov.-Dec. 2008, pp. 22-29.
Li, Jin, et al., "Semantics and Evaluation Techniques for Window Aggregates in Data Streams", ACM SIGMOD 2005, Baltimore, MD, Jun. 14-16, 2005, pp. 311-322.
Mancuso, Renato, et al., "Real-Time Cache Management Framework for Multi-core Architectures", RTAS 2013, Philadelphia, PA, Apr. 9-11, 2013, pp. 45-54.
Mao, Huajian, et al., "Wukong: A cloud-oriented file service for mobile Internet devices", Journal of Parallel and Distributed Computing, vol. 72, Issue 2, Feb. 2012, pp. 171-184.
Non-Final Office Action dated Feb. 23, 2018 for U.S. Appl. No. 15/140,292.
Non-Final Office Action dated Apr. 18, 2018 for U.S. Appl. No. 15/140,310.
Non-Final Office Action dated May 15, 2018 for U.S. Appl. No. 15/140,270.
Notice of Allowance dated Feb. 21, 2018 for U.S. Appl. No. 15/140,330.
Notice of Allowance dated Mar. 14, 2018 for U.S. Appl. No. 15/140,248.
Patroumpas, Kostas, et al., "Maintaining consistent results of continuous queries under diverse window specifications", Information Systems, vol. 36, Issue 1, Mar. 2011, pp. 42-61.
Patroumpas, Kostas, et al., "Window Specification over Data Streams", EDBT 2006 Workshops, LNCS 4254, © IFIP International Federation for Information Processing© 2006, pp. 445-464.
Peng, Chunyi, et al., "VON: Virtual Machine Image Distribution Network for Cloud Data Centers", INFOCOM 2012, Orlando, FL, Mar. 25-30, 2012, pp. 181-189.
Saxena, Moh it, et al., "Flash Tier: A Lightweight, Consistent and Durable Storage Cache", EuroSys '12, Bern, Switzerland, Apr. 10-13, 2012, pp. 267-280.
Stefanov, Emil, et al., "Iris: A Scalable Cloud File System with Efficient Integrity Checks", ACSAC '12, Orlando, FL, Dec. 3-7, 2012, pp. 229-238.
Wang, Haiyang, et al., "On the Impact of Virtualization on Dropbox-like Cloud File Storage/Synchronization Services", IWQoS'12, Coimbra, Portugal, Jun. 4-5, 2012, Article No. 11, 9 pages.
Zhou, Yuanyuan, et al., "Second-Level Buffer Cache Management", IEEE Transactions on Parallel and Distributed Systems, vol. 15, No. 6, Jun. 2004, pp. 505-519.
Notice of Allowance dated Apr. 5, 2019 for U.S. Appl. No. 16/024,748.
Notice of Allowance dated Sep. 6, 2018 for U.S. Appl. No. 15/140,310.
Final Office Action dated Oct. 30, 2018 for U.S. Appl. No. 15/140,270.
Notice of Allowance dated Jun. 15, 2018 for U.S. Appl. No. 15/140,179.
Final Office Action dated Aug. 1, 2018 for U.S. Appl. No. 15/140,292.
Notice of Allowance dated Apr. 5, 2019 for U.S. Appl. No. 15/140,270.
Non-Final Office Action dated Jun. 13, 2019 for U.S. Appl. No. 15/140,292.
Final Office Action dated Mar. 20, 2020 for U.S. Appl. No. 15/140,292.
Notice of Allowance dated Jun. 30, 2020 for U.S. Appl. No. 16/174,202.
Notice of Allowance dated Aug. 7, 2020 for U.S. Appl. No. 16/036,735.
Juve, Gideon, and Ewa Deelman. "Automating application deployment in infrastructure clouds." *2011 IEEE Third International Conference on Cloud Computing Technology and Science.* IEEE, 2011.
Non-Final Office Action dated Apr. 6, 2022 for U.S. Appl. No. 17/182,105.
Final Office Action Dated Aug. 18, 2022 for U.S. Appl. No. 17/182,105.
Notice of Allowance for U.S. Appl. No. 17/195,596 dated Jan. 19, 2023.
Non-Final Office Action dated May 11, 2023 for U.S. Appl. No. 17/182,105.
Non-Final Office Action dated Apr. 27, 2022 for U.S. Appl. No. 17/195,596.
Final Office Action dated Sep. 12, 2022 for U.S. Appl. No. 17/195,596.
Final Office Action dated Oct. 19, 2023 or U.S. Appl. No. 17/182,105.

\* cited by examiner

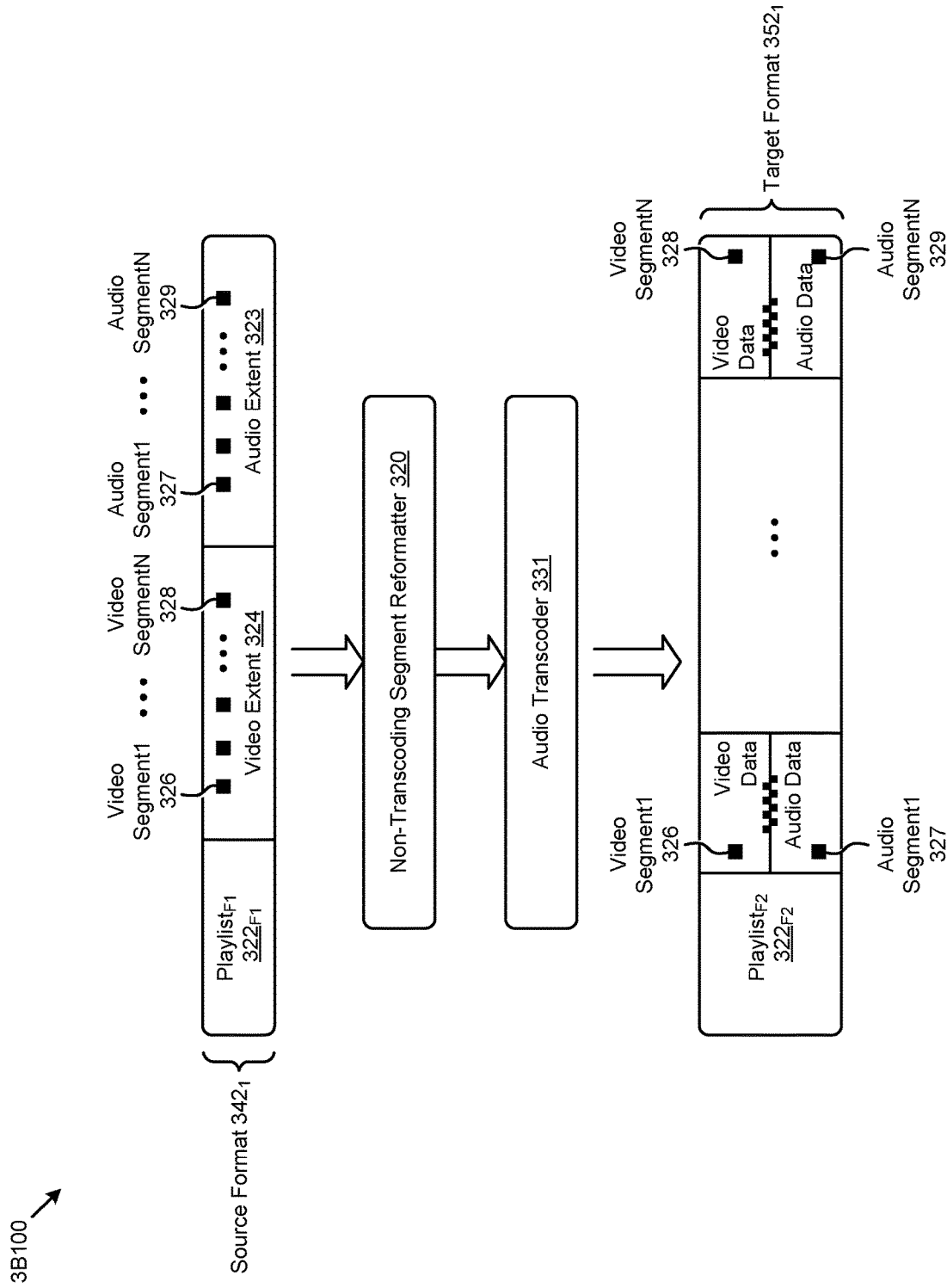
FIG. 3B1

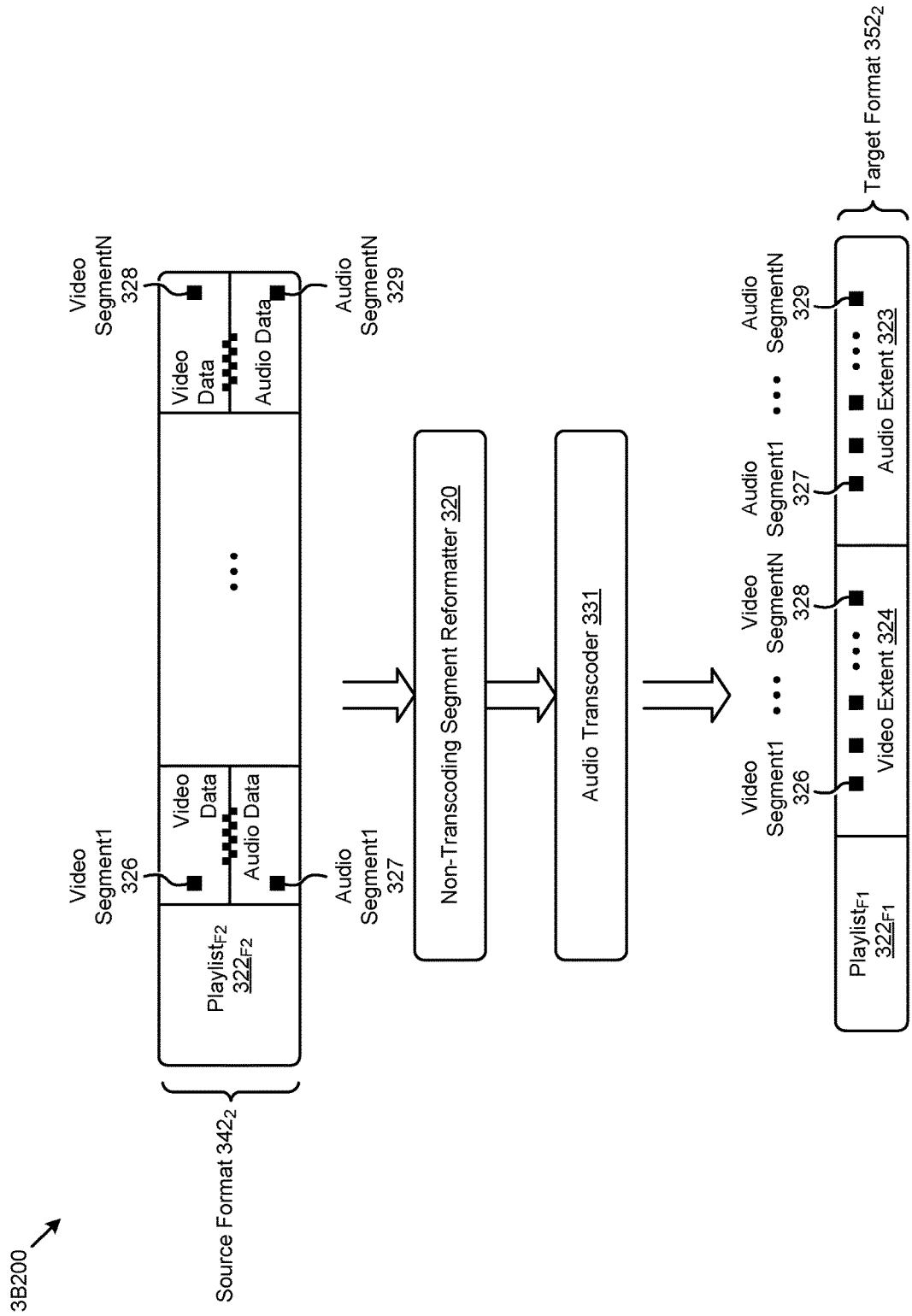
FIG. 3B2

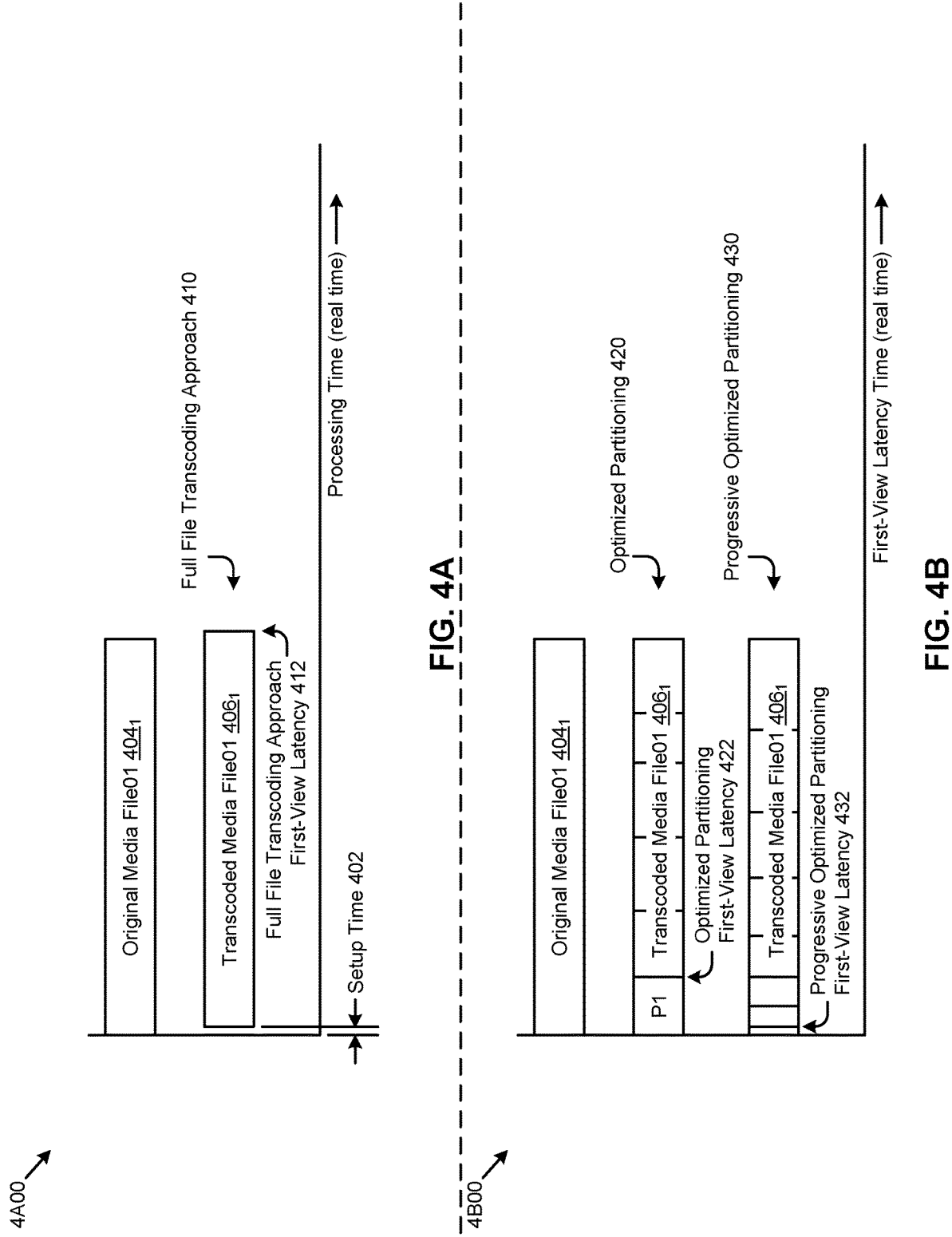

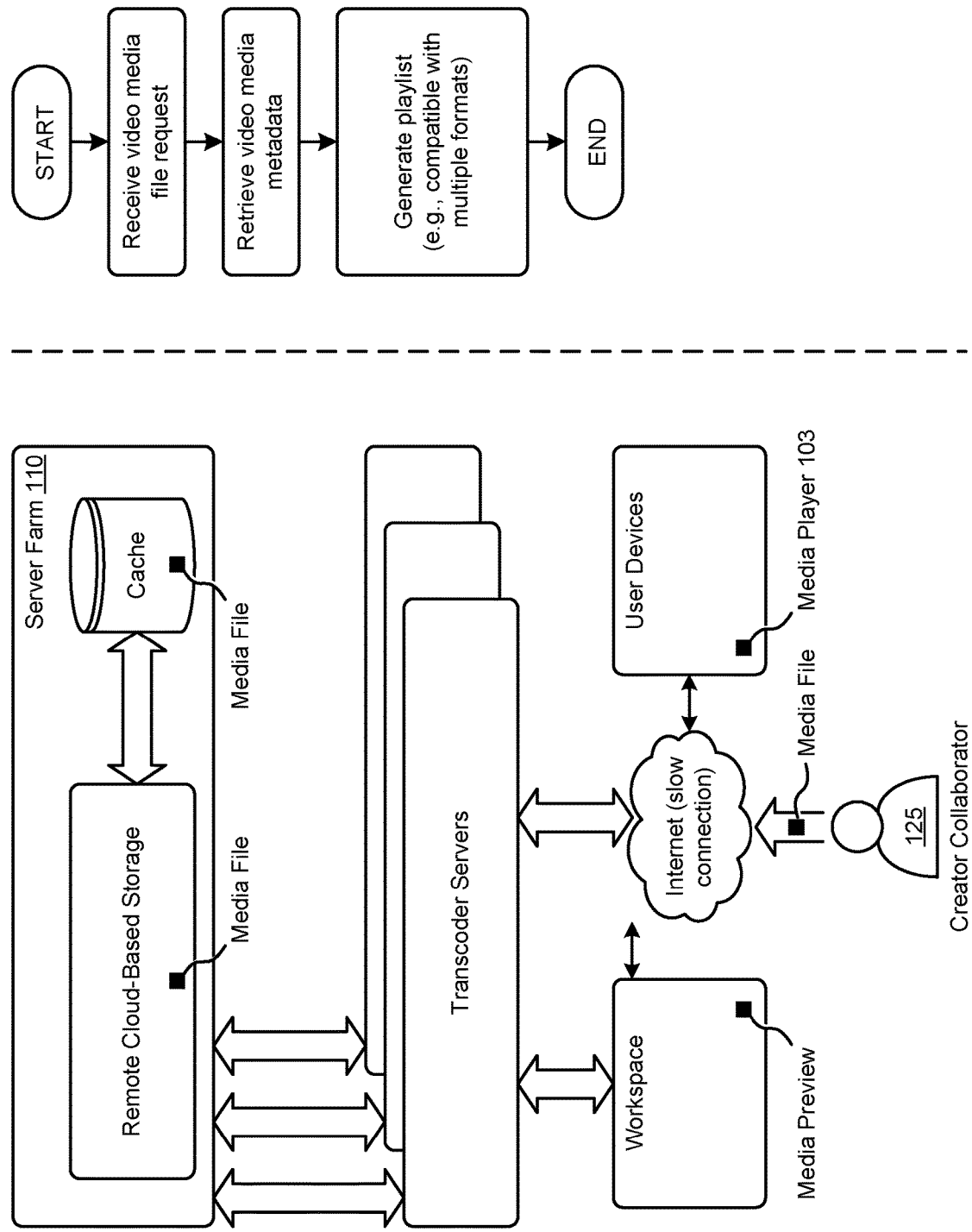
FIG. 6D1

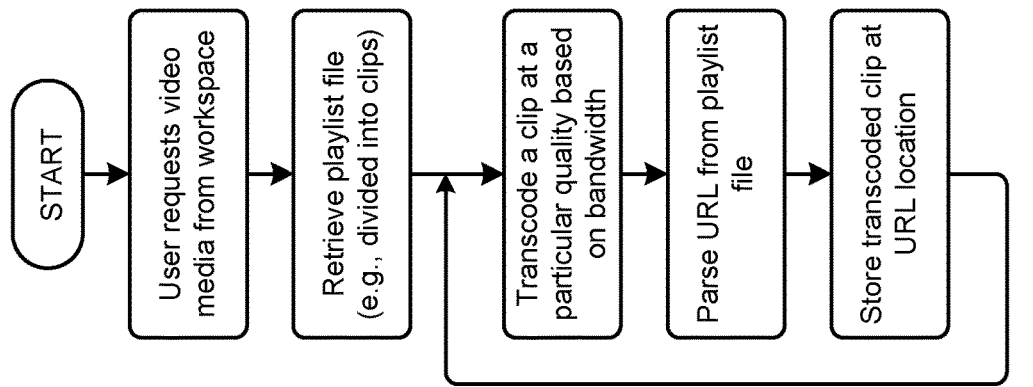
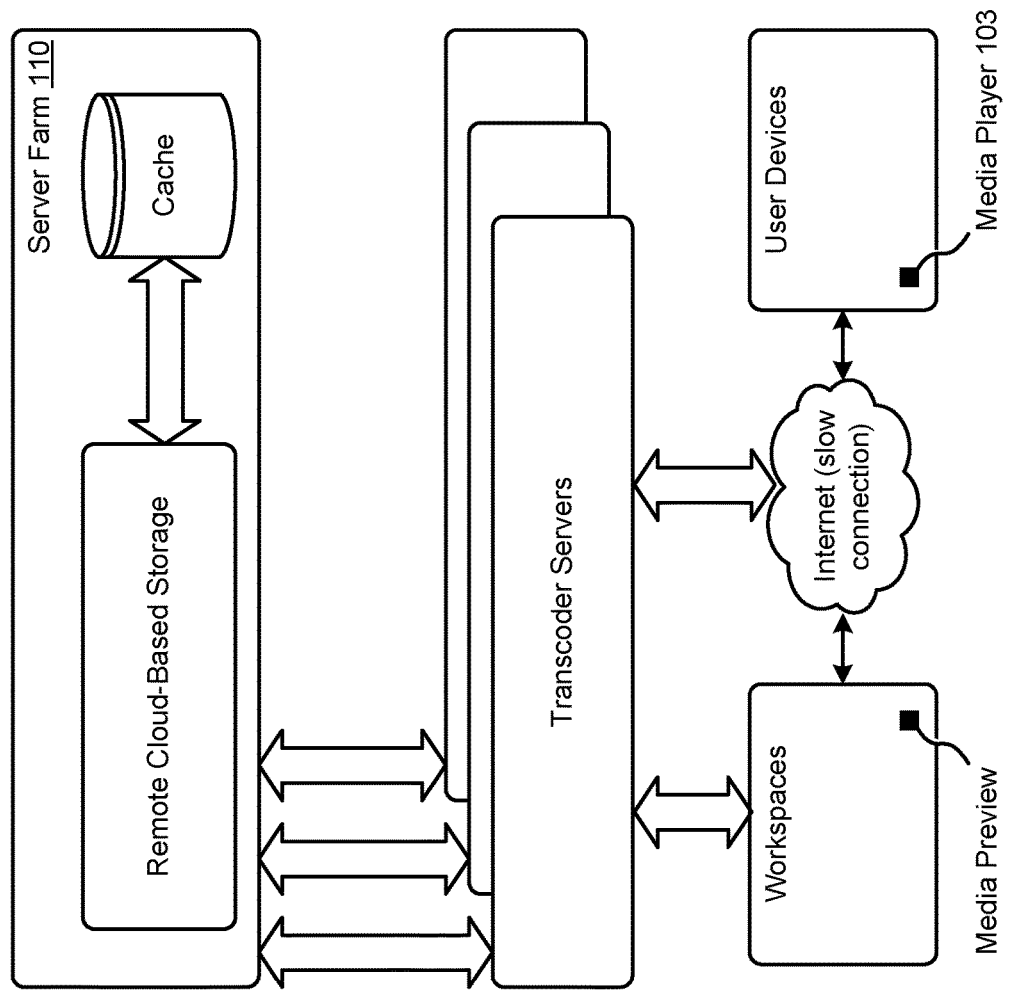
FIG. 6D2

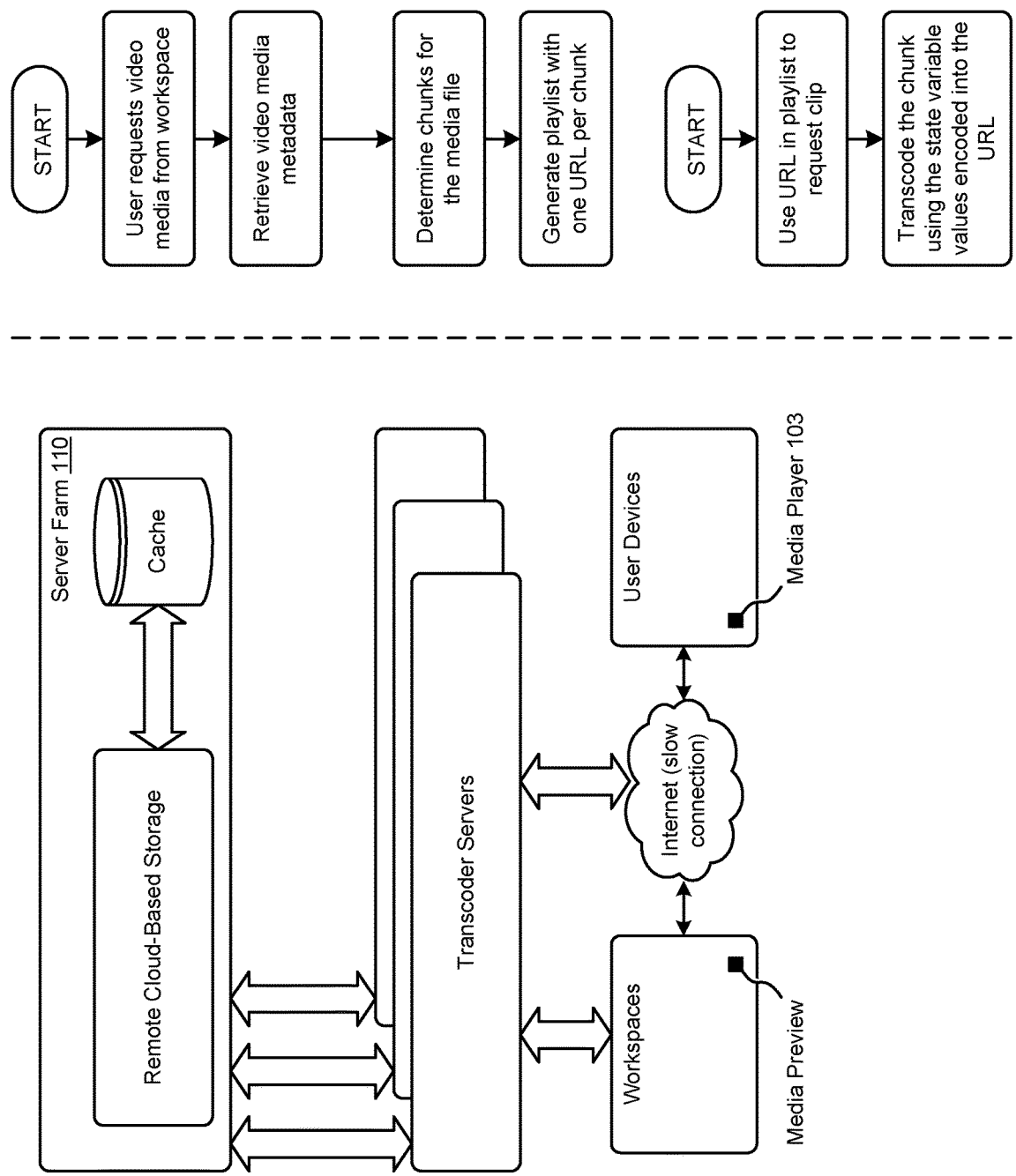
FIG. 6D3

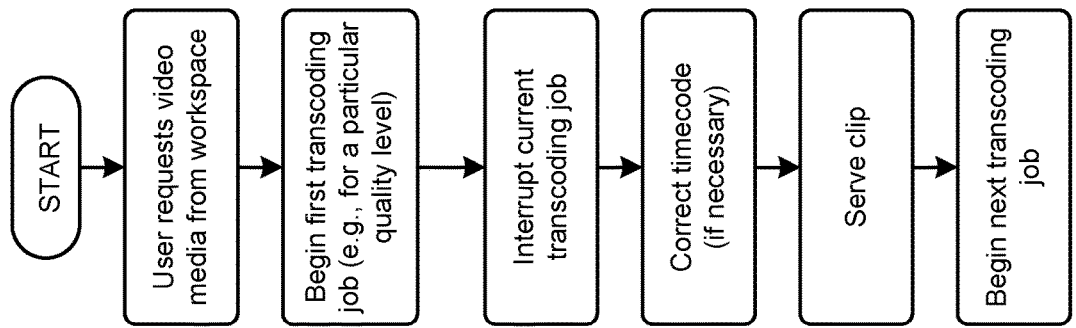
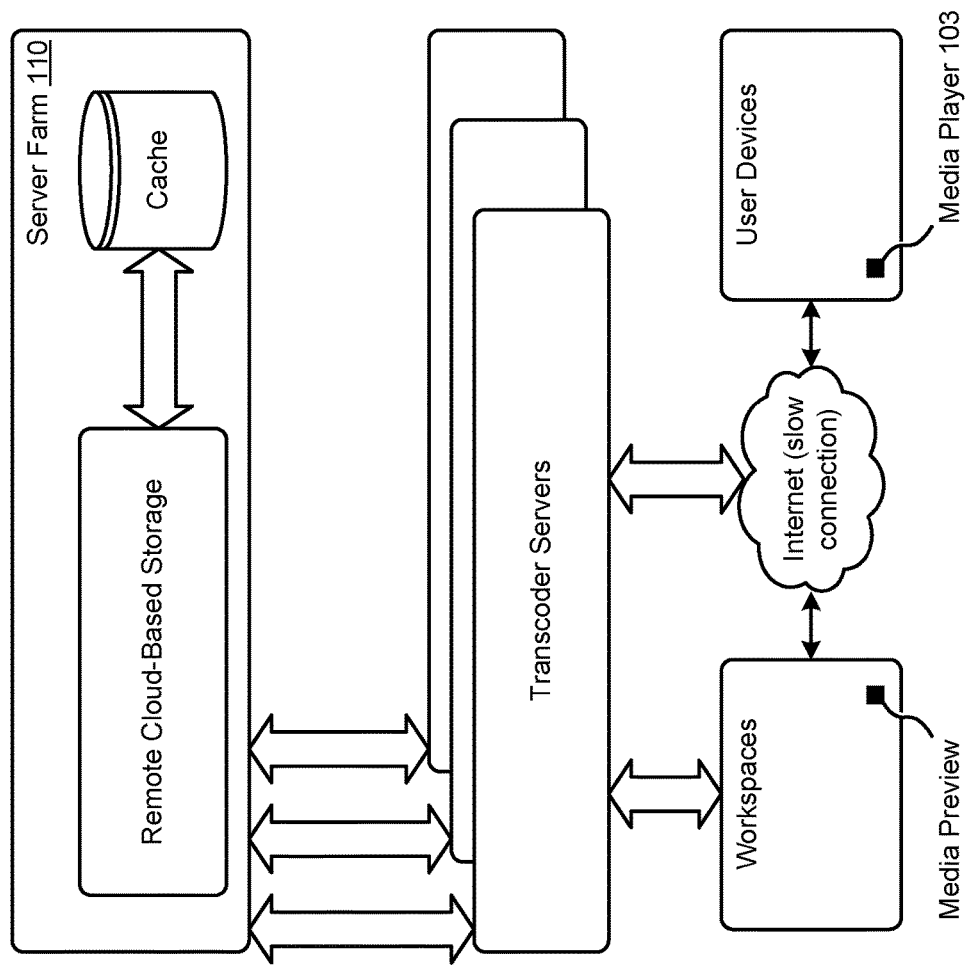
FIG. 6D4

LOW LATENCY AND LOW DEFECT MEDIA FILE TRANSCODING USING OPTIMIZED STORAGE, RETRIEVAL, PARTITIONING, AND DELIVERY TECHNIQUES

RELATED APPLICATIONS

The present application is a continuation of U.S. application Ser. No. 15/140,357, which claims the benefit of priority to U.S. Provisional Patent Application Ser. No. 62/154,658, and also claims benefit of priority to U.S. Provisional Patent Application Ser. No. 62/154,022, all of which are hereby incorporated by reference in their entirety.

FIELD

This disclosure relates to the field of file sharing of large media files, and more particularly to techniques for low latency and low defect media file transcoding using optimized storage, partitioning, and delivery techniques.

BACKGROUND

In today's "always on, always connected" world, people often share video and other media files on multiple devices (e.g., smart phones, tablets, laptops, etc.) for various purposes (e.g., collaboration, social interaction, entertainment, etc.). In some situations, the format (e.g., encoding, container, etc.) of a particular media file needs to be converted (e.g., transcoded) into some other format. There are many reasons why such a conversion or transcoding is needed. For example, a collaborator might have a video file in a first encoding or format, and would want to compress it so as to consume less storage space and/or consume less transmission bandwidth when it is shared (e.g., delivered to collaborating recipients). In many cases, a collaborator would want to view a video as soon as it is posted, however, due to the aforementioned reasons why such a conversion or transcoding might be needed, the video would need to be converted before being made available for previewing or sharing. Further transcoding may be needed for viewing the video using the various media players available on the various devices of the collaborators.

Legacy approaches to the problem of reducing the latency between availability of an original media file (e.g., in a first format) and availability of a transcoded media file (e.g., in a second format) can be improved. In one legacy case, an original media file is sent to an extremely high-powered computer, with the expectation that the transcoding can complete sooner. In other legacy cases, an original media file in a first format is divided into equally sized partitions, and each partition is transcoded in parallel with each other partition. While such a partitioning and parallel processing techniques serve to reduce the latency time to a first viewing of a transcoded media file, such an approach is naïve, at least as pertains to the extent that many of the resulting transcoded partitions exhibit defects.

What is needed is a technique or techniques to improve over legacy and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

What is needed is a technique or techniques to reduce the first-view latency time incurred when transcoding a media file in a first format to a second format while reducing or eliminating defects in the resulting transcoded media file. The problem to be solved is rooted in technological limitations of the legacy approaches. Improvements, in particular improved design, and improved implementation and application of the related technologies, are needed.

SUMMARY

The present disclosure provides improved systems, methods, and computer program products suited to address the aforementioned issues with legacy approaches. More specifically, the present disclosure provides a detailed description of techniques used in systems, methods, and in computer program products for low latency and low defect media file transcoding using optimized partitioning. Certain embodiments are directed to technological solutions for exploiting parallelism when transcoding from a first format to a second format by determining partition boundaries based on the first format. The disclosed techniques and devices within the shown environments as depicted in the figures provide advances in the technical field of high-performance computing as well as advances in the technical fields of distributed computing and distributed storage.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

The drawings described below are for illustration purposes only. The drawings are not intended to limit the scope of the present disclosure.

FIG. 3B1 and FIG. 3B2 are a block diagrams showing media file reformatting as implemented in systems for low latency and low defect media file transcoding using optimized partitioning, according to an embodiment.

FIG. 4A presents a processing timeline to show full file transcoding latency for comparison to techniques for low latency and low defect media file transcoding using optimized partitioning, according to an embodiment.

FIG. 4B presents a latency timeline illustrating a low first-view latency technique used in systems implementing low latency and low defect media file transcoding using optimized partitioning, according to an embodiment.

FIG. 6D1 is a flow diagram illustrating playlist generation from a video clip as used in systems for low latency and low defect media file transcoding using optimized partitioning, according to an embodiment.

FIG. 6D2 is a flow diagram illustrating generation of URLs for video clips as used in systems for low latency and low defect media file transcoding using optimized partitioning, according to an embodiment.

FIG. 6D3 is a flow diagram illustrating generation of URLs for video clips as used in systems for low latency and low defect media file transcoding using optimized partitioning, according to an embodiment.

FIG. 6D4 is a flow diagram illustrating timecode correction techniques used when delivering video clips to viewers as used in systems for low latency and low defect media file transcoding using optimized partitioning, according to an embodiment.

DETAILED DESCRIPTION

Figure 1:
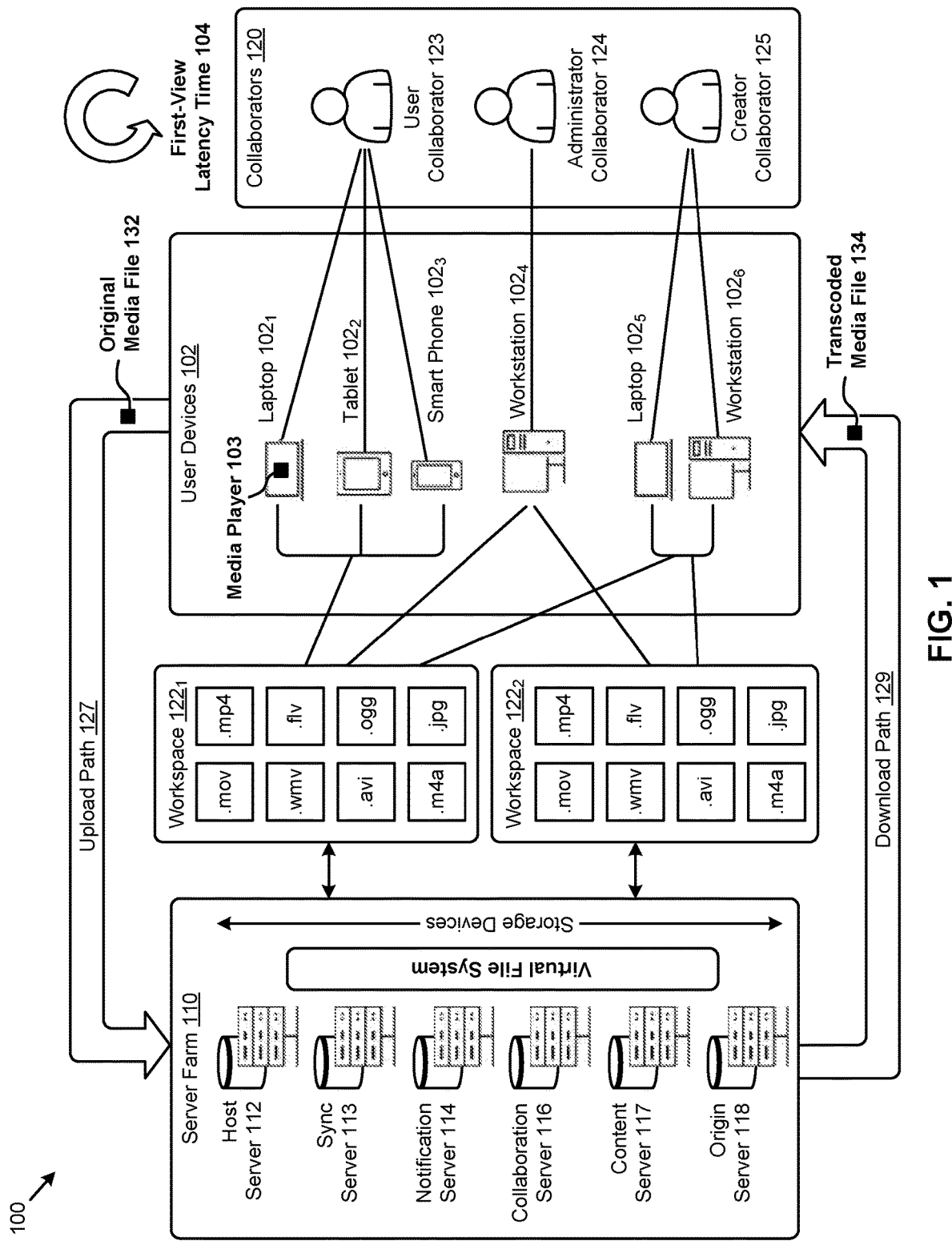
FIG. 1 depicts an environment for using and transcoding media files.

Some embodiments of the present disclosure address the problem of reducing the first-view latency time incurred when transcoding a media file in a first format to a second format, while reducing or eliminating defects in the resulting transcoded file and some embodiments are directed to approaches for exploiting parallelism when transcoding from a first format to a second format by determining partition boundaries based on the first format. More particularly, disclosed herein and in the accompanying figures are exemplary environments, systems, methods, and computer program products for low latency and low defect media file transcoding using optimized partitioning.

OVERVIEW

In today's "always on, always connected" world, people often share video and other media files on multiple devices (e.g., smart phones, tablets, laptops, etc.) for various purposes (e.g., collaboration, social interaction, etc.). In some situations, the format (e.g., encoding, container, etc.) of a particular media file needs to be converted (e.g., transcoded) into some other format. However, a person may want to immediately view and/or her media file, yet may need to wait for the media file to be converted or transcoded. To address the need to reduce the first-view latency time incurred when transcoding a media file in a first format to a second format while reducing or eliminating defects in the resulting transcoded media file, the techniques described herein receive and analyze an original media file to determine optimized partitions for transcoding, and techniques described herein operate in conjunction with cloud-based remote file storage. For example, a custom file system can be employed and/or optimized partitions can be based in part on the target format or formats (e.g., encoding scheme, codec, container, etc.) and/or available computing resources (e.g., storage, processing, communications bandwidth, etc.). Specifically, in one or more embodiments, the partition boundaries can be selected with respect to key frames (e.g., I-frames). For example, a leading edge boundary partition can be selected to be precisely at a key frame, and a trailing edge boundary can be adjacent to a next key frame. When the partitions and partition boundaries have been determined, the partitions can be assigned to computing resources for simultaneous transcoding of the respective partitions. The transcoded media file partitions can then be assembled into a single transcoded video file (e.g., container) and delivered for viewing. In some embodiments, the partitions can include attribute datasets (e.g., moov atoms) such that a first or beginning transcoded partition can be delivered and viewed in advance of the availability and assemblage of the remaining transcoded partitions, thus further reduce the first-view latency time.

Various embodiments are described herein with reference to the figures. It should be noted that the figures are not necessarily drawn to scale and that the elements of similar structures or functions are sometimes represented by like reference numerals throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXEMPLARY EMBODIMENTS

FIG. 1 depicts an environment 100 for using and transcoding media files. As an option, one or more instances of environment 100 or any aspect thereof may be implemented in the context of the architecture and functionality of the embodiments described herein. The environment 100 or any aspect thereof may be implemented in any desired environment.

As shown, the environment 100 supports access to workspaces (e.g., workspace $122_1$ and workspace $122_2$) by a plurality of users (e.g., collaborators 120) through a variety of computing devices (e.g., user devices 102). For example, the collaborators 120 can comprise a user collaborator 123, an administrator collaborator 124, and a creator collaborator 125. In addition, for example, the user devices 102 can comprise one or more instances of a laptop $102_1$ and laptop $102_5$, one or more instances of a tablet $102_2$, one or more instances of a smart phone $102_3$, and one or more instances of a workstation (e.g., workstation $102_4$ and workstation $102_6$). As shown, the workspaces can present to the collaborators 120 a set of documents accessible by each collaborator (e.g., based on permissions). For example, the workspaces can provide certain groups of the collaborators 120 access to a set of media files (e.g., with container file extensions .mov, .mp4, .wmv, .flv, etc.) for various collaboration activities (e.g., creating, sharing, viewing, listening, editing, etc.).

The environment 100 further illustrates the content (e.g., media files) represented in the workspaces can be managed (e.g., converted, transcoded, etc.) and stored on a server farm 110. For example, the server farm 110 can be a cloud-based and/or distributed computing and storage network(s) comprising one or more instances of a host server 112, one or more instances of a sync server 113, one or more instances of a notification server 114, one or more instances of a collaboration server 116, one or more instances of a content server 117, and one or more instances of an origin server 118. In certain embodiments, other combinations of computing devices and storage devices can comprise the server farm 110. The collaborators 120 interact with the workspaces to upload media files (e.g., original media file 132) through an upload path 127 to the server farm 110. The collaborators 120 can further interact with the workspaces to download media files (e.g., transcoded media file 134) through a download path 129 from the server farm 110.

Figure 2B:
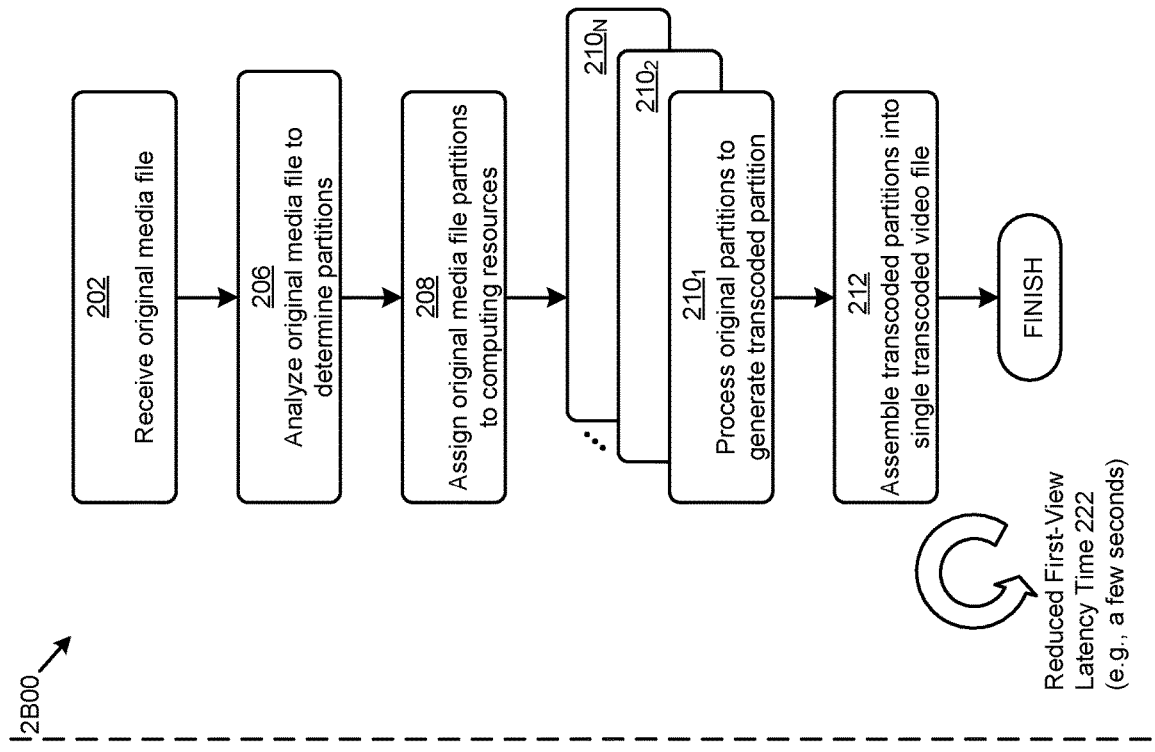
FIG. 2B presents a diagram illustrating techniques for low latency and low defect media file transcoding using optimized partitioning, according to an embodiment.

As an example, the creator collaborator 125 may have just posted a new video (e.g., original media file 132 over the upload path 127) that is shared with the user collaborator 123 in the workspace $122_1$, and the user collaborator 123 selected the new video for viewing on laptop $102_1$. However, a media player 103 on laptop $102_1$ and/or the associated computing resource constraints (e.g., of laptop $102_1$, of download path 129, etc.) may demand the original media file 132 be transcoded to the transcoded media file 134 having a video playback format (e.g., advanced systems format (ASF) file) that is different than the original media file 132 format (e.g., MP4). In this case, one or more servers in the server farm 110 can perform the transcoding using various approaches, where the choice of approach will impact a first-view latency time 104 (e.g., the time from a request to view to the start of viewing) and extent of viewing quality defects experienced by the user collaborator 123 and other users. A comparison of one approach shown in FIG. 2A to the herein disclosed approach shown in FIG. 2B is described in the following.

Figure 2A:
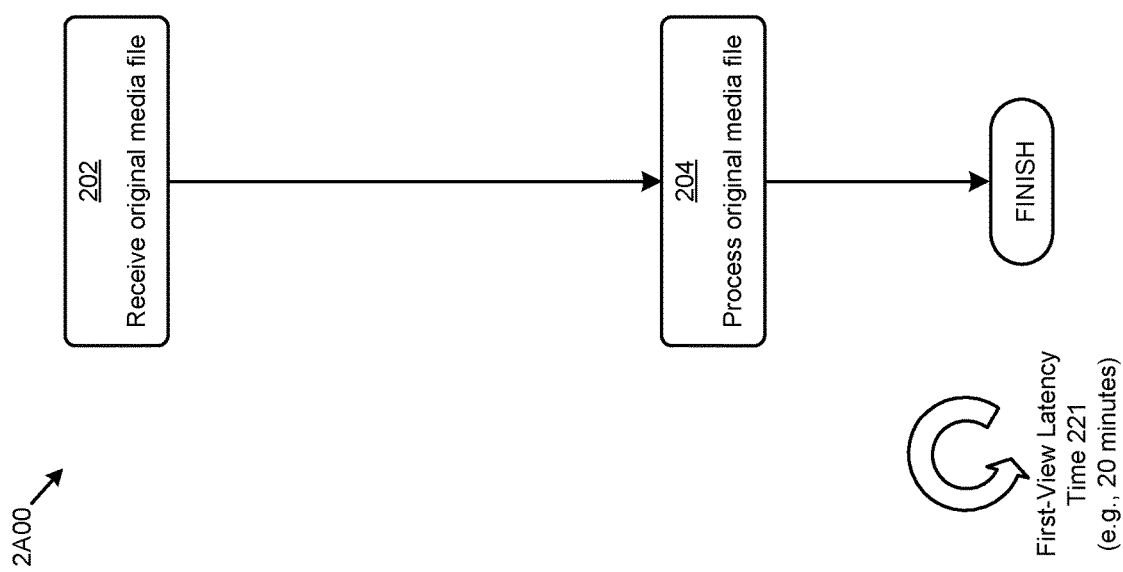
FIG. 2A presents a diagram depicting a full file transcoding approach for comparison of techniques for performing low latency and low defect media file transcoding using optimized partitioning.

FIG. 2A presents a diagram 2A00 depicting a full file transcoding approach for comparison of techniques for performing low latency and low defect media file transcoding using optimized partitioning. As an option, one or more instances of diagram 2A00 or any aspect thereof may be implemented in the context of the architecture and functionality of the embodiments described herein. The diagram 2A00 or any aspect thereof may be implemented in any desired environment.

One approach to transcoding a media file is shown in diagram 2A00. For example, a video file may need to be transcoded for viewing by a user. As shown, the approach receives an original media file (see step 202) and proceeds to process (e.g., transcode) the entire original media file (see step 204). In this legacy full file transcoding approach, the user desiring to view the media file will need to wait until the entire media file is transcoded before being able to view the transcoded media file. In some cases, processing the original media file can comprise two steps of first converting to an intermediate format and then converting to a target format. A first-view latency time 221 using the approach shown in diagram 2A00 can be improved by using high-powered computing resources, yet the first-view latency time 221 can remain long. For example, a 30-minute video can take 20 minutes to be transcoded and made ready for viewing using the full file transcoding approach shown in FIG. 2A. The first-view latency time 221 will further increase as the demanded resolution of the video increases.

In some cases, an original media file is sent to an extremely high-powered computer, with the expectation that the transcoding can complete sooner. In other cases, an original media file in a first format is divided into equally sized partitions, and each partition is transcoded in parallel with each other partition. For example, when an original media file in a first format is divided into N equally sized partitions, then the time to complete the transcoding can theoretically be reduced a time proportional to 1/N. While this divide by N partitioning and parallel processing technique serves to reduce the latency time to a first viewing of a transcoded media file, such an approach can be improved upon, at least as pertains to the aspect that many of the resulting transcoded partitions exhibit defects. For example, many of the resulting transcoded partitions exhibit image distortions brought about by generating clip boundaries according to strict divide by N partitioning.

One improved approach implemented in the herein disclosed techniques for low latency and low defect media file transcoding using optimized partitioning is described as pertains to FIG. 2B.

FIG. 2B presents a diagram 2B00 illustrating techniques for low latency and low defect media file transcoding using optimized partitioning. As an option, one or more instances of diagram 2B00 or any aspect thereof may be implemented in the context of the architecture and functionality of the embodiments described herein. The diagram 2B00 or any aspect thereof may be implemented in any desired environment.

The approach illustrated in diagram 2B00 implements an optimized partitioning of a media file for low latency and low defect transcoding. Specifically, the set of steps describing such an approach begins with receiving an original media file (see step 202) and analyzing the original media file to determine optimized partitions for transcoding (see step 206). For example, optimized partitions can be based in part on the target format or formats (e.g., encoding scheme, codec, container, etc.) and/or available computing resources (e.g., storage, processing, communications bandwidth, etc.). In some cases the size of a partition might vary with environmental considerations. Specifically, in one or more embodiments, the leading-edge partition boundaries can be at encoding key frames (e.g., I-frames). When the partitions and partition boundaries have been determined, the partitions can be assigned to computing resources for transcoding (see step 208). The computing resources (e.g., server farm 110) can then transcode the original media file partitions to respective transcoded media file partitions (see parallel steps of step $210_1$, step $210_2$, to step $210_N$). The transcoded media file partitions can then be assembled into a single transcoded video file (e.g., container) (see step 212).

The herein disclosed approach and technique presented in diagram 2B00 has several advantages. For example, partitioning the media file (e.g., into N partitions) for parallel transcoding across a distributed computing system (e.g., N servers) can reduce a first-view latency time (e.g., by a factor of 1/N) as compared to a full file transcoding approach. Further, by determining optimal partitions and partition boundaries (e.g., aligned with key frames), defects in the resulting transcoded file can be minimized or eliminated. In addition, a user can start viewing the transcoded media file when the first partition has been transcoded or the first set of partitions have been transcoded, such that viewing can begin before the transcoded file has been assembled. For example, a reduced first-view latency time 222 for a 30-minute video using the herein disclosed approach shown in diagram 2B00 can be a few seconds (e.g., when the first partition has been transcoded and delivered). More details regarding the partitioning of media files are shown and described as pertains to FIG. 3A, FIG. 3B1, FIG. 3B2, FIG. 3C and FIG. 3D.

Figure 3A:
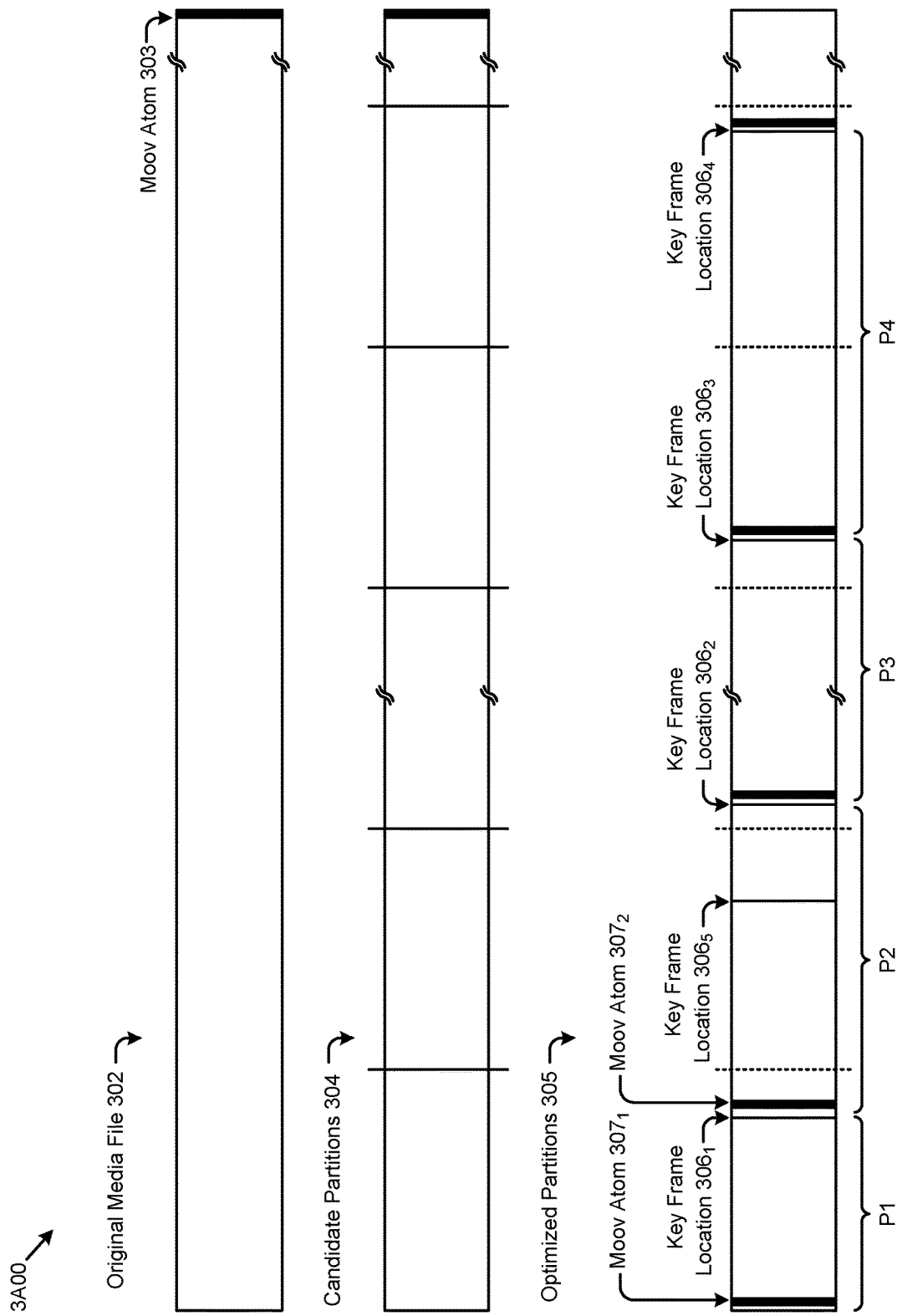
FIG. 3A is a chart showing media file partitioning as implemented in systems for low latency and low defect media file transcoding using optimized partitioning, according to an embodiment.

FIG. 3A is a chart 3A00 showing media file partitioning as implemented in systems for low latency and low defect media file transcoding using optimized partitioning. As an option, one or more instances of chart 3A00 or any aspect thereof may be implemented in the context of the architecture and functionality of the embodiments described herein. The chart 3A00 or any aspect thereof may be implemented in any desired environment.

The chart 3A00 shows a time-based representation of an original media file 302 in a first encoding format or a first set of encoding formats. As shown, for example, the original media file 302 can be a video file packaged in a container that comprises a moov atom at the end. The moov atom, also referred to as a movie atom, is an attribute dataset comprising information about the original media file 302 such as the timescale, duration, display characteristics of the video, sub-atoms containing information associated with each track in the video, and other attributes. As shown, an original moov atom 303 is present at the end of the original media file 302. When transcoding of the original media file 302 is demanded, the original media file 302 can be analyzed to determine a set of candidate partitions 304 for parallel processing. For example, in legacy approaches, the candidate partitions can be determined by equally dividing (e.g., into units of time or duration) the original media file 302 by the number of computing resources (e.g., servers) available for parallel transcoding operations. In this case, however, the candidate partitions 304 may have partition boundaries that result in defects in the playback of the assembled transcoded media file. Such defects can comprise subjective quality as perceived by a user (e.g., blockiness, blurriness, ringing artifacts, added high frequency content, picture outages, freezing at a particular frame and then skipping forward by a few seconds, etc.). In many cases, objective metrics that characterize one or more aspects of playback quality can be computed (e.g., frame-by-frame comparison of an original object and a transcoded object).

In one embodiment, the herein disclosed techniques can determine a set of optimized partitions 305 for transcoding the original media file 302 to reduce first-view latency and reduce or eliminate transcoding defects. As shown, for example, a set of key frame locations (e.g., key frame location 3061, key frame location 3062, key frame location 3063, key frame location 3064, key frame location 3065) can be used to define the boundaries of the file partitions (e.g., P1, P2, P3, and P4). In some embodiments, the key frame locations can be defined in the original media file 302, and in certain embodiments, the key frame locations can be based in part on the target transcoding format or formats. In one or more embodiments, the candidate partitions 304 (e.g., based on an optimal set of computing resources to deliver low latency) can be aligned to the closest key frame location (e.g., based on an optimal partitioning boundary to deliver low defects). For example, key frame location 3062 is chosen as a partition boundary over key frame location 3065 as being closer to an instance of a candidate partition 304. In some cases and embodiments, a set of moov atoms can be included at various positions in one or more partitions based in part on the known and/or expected delivery and playback method. For example, each instance of a partition in the optimized partitions 305 is shown to have a moov atom at the beginning of the partition (e.g., see moov atom 3071 in partition P1 and moov atom 3072 in partition P2). Positioning the moov atom at the beginning of the partitions can reduce the first-view latency by enabling the user media player to start decoding and playing the first partition (e.g., P1) independently of the transcoding completion status and delivery of the other partitions (e.g., for video streaming, progressive downloading, etc.).

FIG. 3B1 presents a block diagram 3B100 showing media file reformatting as implemented in systems for low latency and low defect media file transcoding using optimized partitioning. The techniques for media file reformatting can be practiced in any environment.

As shown, a media file is laid out in a first format (e.g., the shown source format) where the file is organized into multiple adjacent partitions. The adjacent partitions comprise playlist data (e.g., $playlist_{F1}$ $322_{F1}$), video data (e.g., video extent 324), and audio data (e.g., audio extent 323). One way to convert from a source format $342_1$ to a target format $352_1$ is to use a multi-format transcoder where the multi-format transcoder accepts a media file in a source format and produces a media file in a target format. Another way to convert from certain source formats to certain target formats is to use a non-transcoding segment reformatter 320.

Such a non-transcoding segment reformatter 320 segments a video stream into a plurality of video segments (e.g., video segment1 326 through video segmentN 328). In some cases, and as shown, a particular video segment may have corresponding audio data (e.g., the soundtrack for the particular video segment).

A non-transcoding segment reformatter 320 can combine (e.g., interleave) a particular video segment with corresponding audio data. The act of combining can include producing a series of extents (e.g., 512 byte blocks or 1 k byte blocks) that can be stored as a file. As shown an extent includes both video data and audio data. The combination into the extent can involve interleaving. Interleaving can be implemented where one extent comprises a video segment (e.g., video segment1 326, or video segmentN 328) as well as an audio segment (e.g., audio segment1 327, or audio segmentN 329). Different interleaving techniques interleave within an extent at different degrees of granularity. For example, the combination of video data and audio data within the extent can involve interleaving at a block-level degree of granularity, or at a timecode degree of granularity, or at a byte-by-byte or word-by-word degree of granularity.

In some embodiments, a non-transcoding segment reformatter 320 can combine video in a particular video format (e.g., in an HTTP live streaming (HLS) format or a dynamic adaptive streaming over HTTP (DASH) format) with corresponding audio data in a particular audio format or encoding (e.g., as an advanced audio coding (AAC) stream or as an MP3 stream). In some cases interleaving can be implemented by merely moving video or audio segments from one location (e.g., from a location in a source format) to a location in a target format without performing signal-level transcoding operations. In some cases interleaving can be implemented by merely moving video segments from one location (e.g., from a location in a source format) to an allocation in a target format without performing any video signal-level transcoding operations. Audio data can segmented and transcoded as needed (e.g., using the shown audio transcoder 331) to meet the specification of the target format. For example, situations where the video is already being delivered in a standard H.264 encoding, the video doesn't need to be re-transcoded, however if the audio is encoded using (for example) the free lossless audio codec (FLAC), the audio might need to be transcoded into an appropriate target format (MP3, high-efficiency advanced audio coding (HE-AAC), or AC-3).

Some formats include a playlist. Such a playlist might identify titles or chapters or other positions in a corresponding stream. For example, the playlist$_{F1}$ 322$_{F1}$ in the depicted source format includes a series of markers (e.g., titles or chapters or other positions). For each marker, the playlist$_{F1}$ 322$_{F1}$ includes two pointers or offsets: (1) into the video data extent 324, and (2) into the audio data extent 323. Strictly as an additional example, the playlist$_{F2}$ 322$_{F2}$ in the depicted target format includes a series of markers (e.g., titles or chapters or other positions) where, for each marker, the playlist$_{F2}$ 322$_{F2}$ includes one pointer to an extent. The degree of interleaving is assumed or inherent or can be determined from characteristics of the target format.

FIG. 3B2 presents a block diagram 3B200 showing a variation of the media file reformatting as depicted in FIG. 3B1. One way to convert from a source format 342$_2$ to a target format 352$_2$ is to use a multi-format transcoder where the multi-format transcoder accepts a media file in a source format (e.g., in an interleaved format) and produces a media file in a target format (e.g., comprising a video extent and an audio extent).

Figure 3C:
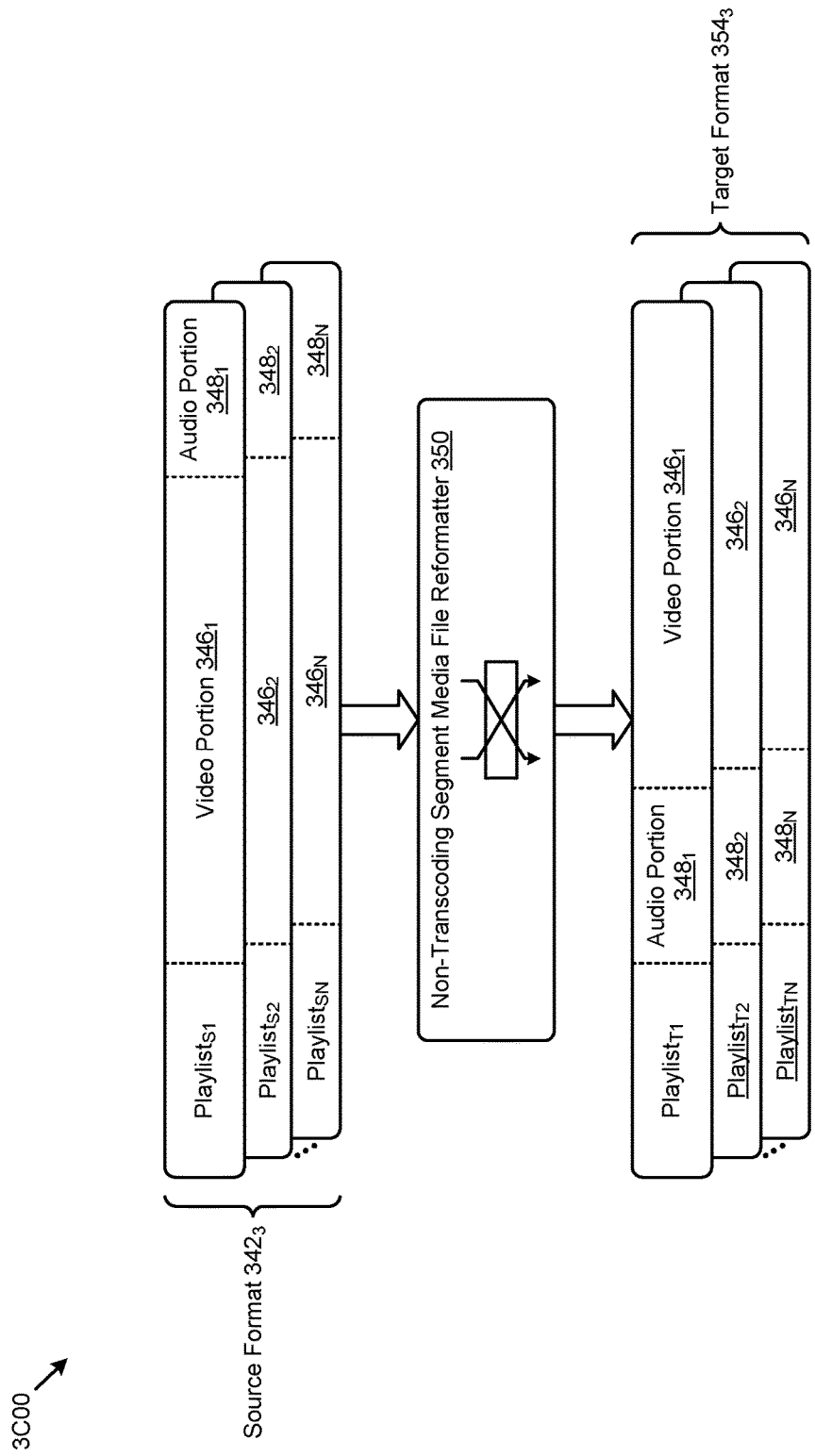
FIG. 3C depicts media file reformatting as implemented in systems for low latency and low defect media, according to an embodiment.

FIG. 3C depicts a media file reformatting system 3C00 as implemented in systems for low latency and low defect media file transcoding. As shown, one or more media files comprise a video portion, a respective audio portion, and a respective playlist. Each of the shown video files are encoded and/or formatted in a source format 342$_3$. A non-transcoding media file reformatter 350 serves to process each video portion, its respective audio portion, and its respective playlist so as to generate a media file in the target format 354$_3$.

In some embodiments the non-transcoding media file reformatter 350 moves video data from its position in the media file of the source format (e.g., preceding the audio portion) to a position in the target format (e.g., following the audio portion). As shown, the video portions of a media file (e.g., video portion 346$_1$, video portion 346$_2$, video portion 346$_N$) are moved to different positions in the media file of the target format. Also as shown, the audio portions of a media file (e.g., audio portion 348$_1$, audio portion 348$_2$, audio portion 348$_N$) are moved to different positions in the media file of the target format. Playlists of media files in the source format (e.g., playlist$_{S1}$, playlist$_{S2}$, ... playlist$_{SN}$) are converted using the non-transcoding segment media file reformatter 350 such that the playlists of media files in the target format (e.g., playlist$_{T1}$, playlist$_{T2}$, ... playlist$_{TN}$) are adjusted so as to point to the same titles, chapters, locations, etc. as were present in the playlists of media files in the source format.

Figure 3D:
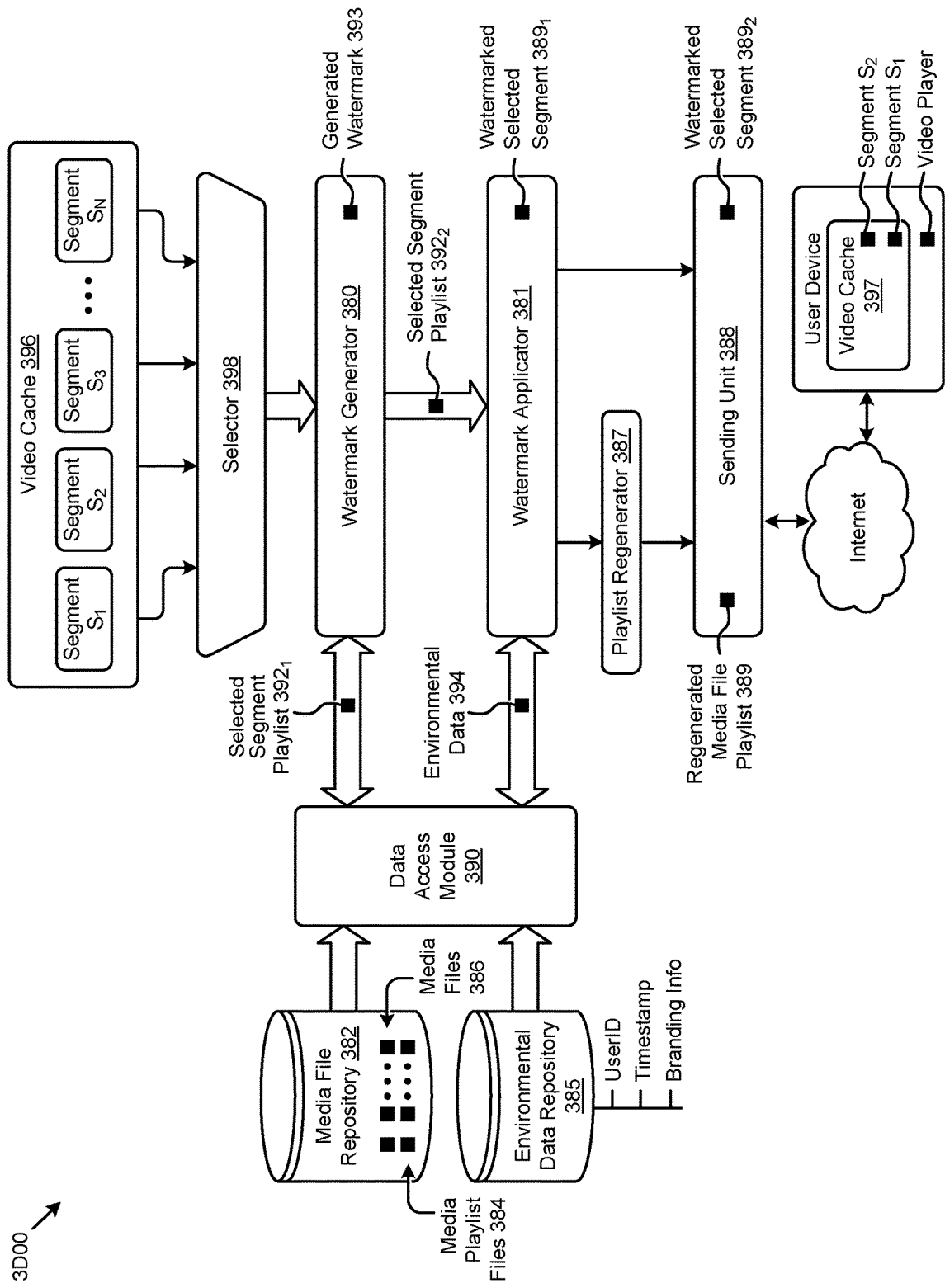
FIG. 3D depicts an on-the-fly watermarking system as implemented in systems for low latency and low defect media file transcoding, according to an embodiment.

FIG. 3D depicts an on-the-fly watermarking system 3D00 as implemented in systems for low latency and low defect media file transcoding. As shown, the system includes a watermark generator 380 and a watermark applicator 381. On-the-fly watermarking is performed as follows: A server video cache 396 holds video segments that are made ready for delivery to a user/viewer. At some moment before delivery to the user/viewer, a selector 398 determines a next video segment (e.g., segment S$_1$, segment2 S$_2$, segment3 S$_3$, ..., segmentN S$_N$) to send over a network (e.g., using sending unit 388) to a device destination prescribed by the user/viewer.

The watermark generator 380 has access (e.g., through a data access module 390) to a media file repository 382 that stores media files 386 as well as media playlist files 384. The watermark generator 380 further has access to an environmental data repository 385. A watermark can be generated based on any combination of data retrieved from any source. For example, a watermark can contain a user's unique information (e.g., name or nickname or email alias, etc.), and/or the name or identification of the user's device, the time of day, copyright notices, logos, etc. The watermark can be placed over the entire video and/or in a small section, and/or move around every X frames or Y seconds, etc. The watermark itself can also update as the video stream progresses.

In exemplary embodiments watermark can be generated by combining a segment from the server video cache with environmental data 394 retrieved from the environmental data repository 385. More specifically, a video segment can be watermarked by applying an image over one or more frames in the selected video segment. The aforementioned image might be an aspect of the requesting user, possibly including the requesting user's userID, either based on a plain text version of the userID, or based on an obfuscated version of the userID. In some scenarios, the aforementioned image might include an aspect of a time (e.g., a timestamp), and/or some branding information (e.g., a corporate logo).

In some cases, the watermark generator 380 performs only watermark generation so as to produce a generated watermark 393 and passes the generated watermark to the watermark applicator 381. The watermark applicator in turn can apply the generated watermark 393 to a video segment so as to produce watermarked selected segments (e.g., watermarked selected segment $389_1$, watermarked selected segment $389_2$). In some cases a watermark can be included in or on an added frame. In such cases, the length of the video segment is changed (e.g., by the added frame). As such, the playlist regenerator 387 can retrieve and process a selected segment playlist (e.g., see selected segment playlist $392_1$ and selected segment playlist $392_2$) as well as instructions from the watermark applicator (e.g., "added one frame immediately after frame 0020") so as to produce a regenerated media file playlist 389 that corresponds to the media file from which the selected segment was cached.

In the context of watermarking video streams as well as in other video streams, some or all of the files in the file system may actually be located in a remote storage location (e.g., in a collaborative cloud-based storage system). To avoid incurring delays in the downloading and processing of that data, a client-side video cache 397 can be implemented. As such, serving of video segments is enhanced.

For example, consider the situation when a video file in a file system is selected to be played on a client-local video player, but the file is actually located across the network at another network location (e.g., on a server). If network conditions are perfect and download speeds are high enough, then it is quite possible for the video to be streamed across the network without any stalls or interruptions in the display of the video data. However, situations often exist where video downloads still need to perform even when the network conditions are not ideal. Consider if the system is configured such that the video starts being displayed as soon as portions of the video data are received at the local client. In this situation, there is likely to be intermittent interruptions in the video display, where a portion of the video is played, followed by an annoying stall in video playing (as network conditions cause delays in data downloads), followed by more of the video being displayed as additional data is downloaded.

The present embodiment of the invention provides an improved approach to display data in a virtual file system that significantly eliminates these intermittent interruptions. In the present embodiment, the data is not always immediately queued for display to the user. Instead, chunks (e.g., segments) of data are continuously requested by a client-local module (e.g., a client-local video player), and the data starts being displayed only when there are sufficient amounts of data (e.g., a sufficient number of segments) that has been locally received to ensure smooth display of the data. This approach therefore avoids the problems associated with immediate playback of data, since there should always be enough data on hand to smooth out any changes in network conditions.

FIG. 3D includes one approach to implement aspects of video segment caching. In the depicted system, a request originating from a user device is received by the server. The requested data may correspond to any granularity of data (e.g., block, segment, chapter, title, etc.). For example, an entire media file or title may be requested; or, only a range of blocks or chapter of the media can be requested. Further, the requested data may pertain to any type of structure or format.

FIG. 4A presents a processing timeline 4A00 to show full file transcoding latency for comparison to techniques for low latency and low defect media file transcoding using optimized partitioning. As an option, one or more instances of processing timeline 4A00 or any aspect thereof may be implemented in the context of the architecture and functionality of the embodiments described herein. The processing timeline 4A00 or any aspect thereof may be implemented in any desired environment.

Processing timeline 4A00 shows an original media file01 $404_1$ transcoded into a transcoded media file01 $406_1$ using a full file transcoding approach 410. As shown, such an approach introduces a setup time 402 for a computing device or resource to prepare for transcoding an entire media file (e.g., a two-hour movie). The full file transcoding approach 410 then proceeds to transcode the original media file01, requiring that a user desiring to view the transcoded file wait until the entire file is transcoded, thus experiencing a full file transcoding approach first-view latency 412. For example, transcoding a one-hour video to certain combinations of formats and resolutions can result in the full file transcoding approach first-view latency 412 being one to two hours. For comparison to the full file transcoding approach 410, FIG. 4B illustrates the herein disclosed techniques for reducing the first-view latency of transcoded media files, while minimizing or eliminating defects in the transcoded media files.

FIG. 4B presents a latency timeline 4B00 illustrating a low first-view latency technique used in systems implementing low latency and low defect media file transcoding using optimized partitioning. As an option, one or more instances of latency timeline 4B00 or any aspect thereof may be implemented in the context of the architecture and functionality of the embodiments described herein. The latency timeline 4B00 or any aspect thereof may be implemented in any desired environment.

Optimized Partitioning Approach Using Increasing Chunk Size

Latency timeline 4B00 shows an original media file01 $404_1$ transcoded into a transcoded media file01 $406_1$ using an optimized partitioning approach 420 and a progressive optimized partitioning approach 430 according to the herein disclosed techniques for low latency and low defect media file transcoding using optimized partitioning. Specifically, the optimized partitioning approach 420 can determine optimized partitioning of the original media file01 based in part on the current and/or target format (e.g., key frame location) and/or available computing resources. The resulting partitions are delivered to a set of computing resources for parallel processing (e.g., transcoding) and assembled into a file container. As shown, in some embodiments, the transcoded file can be viewed by a user when the first partition (e.g., P1) has been processed and delivered, resulting in an optimized partitioning first-view latency 422. In the embodiment implementing the progressive optimized partitioning approach 430, the first partition is relatively small to enable a faster transcoding processing time for an initial clip. A shorter progressive optimized partitioning first-view latency 432 can be implemented to improve still further over the earlier-described latency of optimized partitioning first-view latency 422. In both approaches shown in FIG. 4B, the first-view latencies can be substantially shorter (e.g., seconds) than the full file transcoding approach first-view latency 412 as shown in FIG. 4A (e.g., hours). The initial relatively small clip enables a faster transcoding processing time for an initial clip. Successively larger chunks (e.g., clip size) can be determined as transcoding proceeds through the original media file. More particularly, although the initial, relatively small clip is transcoded and presented to the requestor with low latency, the successively larger clip sizes can improve overall performance of the system as a whole. Use of progressive chunk size (e.g., even for just a few of the chunks after the first one) facilitates delivering more and better quality upgrades (e.g., via more and better quality levels) at a faster rate. Consider a system that implements equal chunk sizes of 10 seconds. In such a case, a quality upgrade can only happen at a chunk boundary. It follows then that it would take at least 10 seconds of playback before the quality can be upgraded. Initially, the client starts with a default quality (e.g., a very low one such as 360p). If the client can actually support 1080p, which may be four quality jumps away, it will take 4 chunk times (40 seconds) to reach that quality. By using progressive chunk sizes initially, the amount of time it takes to upgrade to the maximum available quality is shortened. An alternative technique for making all the chunks into small sizes (e.g., 2 seconds each) so as to reduce the chunk time quantum would result in a very large number of chunks—and each individual network request (e.g., request for a chunk) introduces communication latency and processing overhead, resulting in undesired slower retrieval of data. Increasing the chunk size strikes a balance between use of system resources and user experience.

Figure 5:
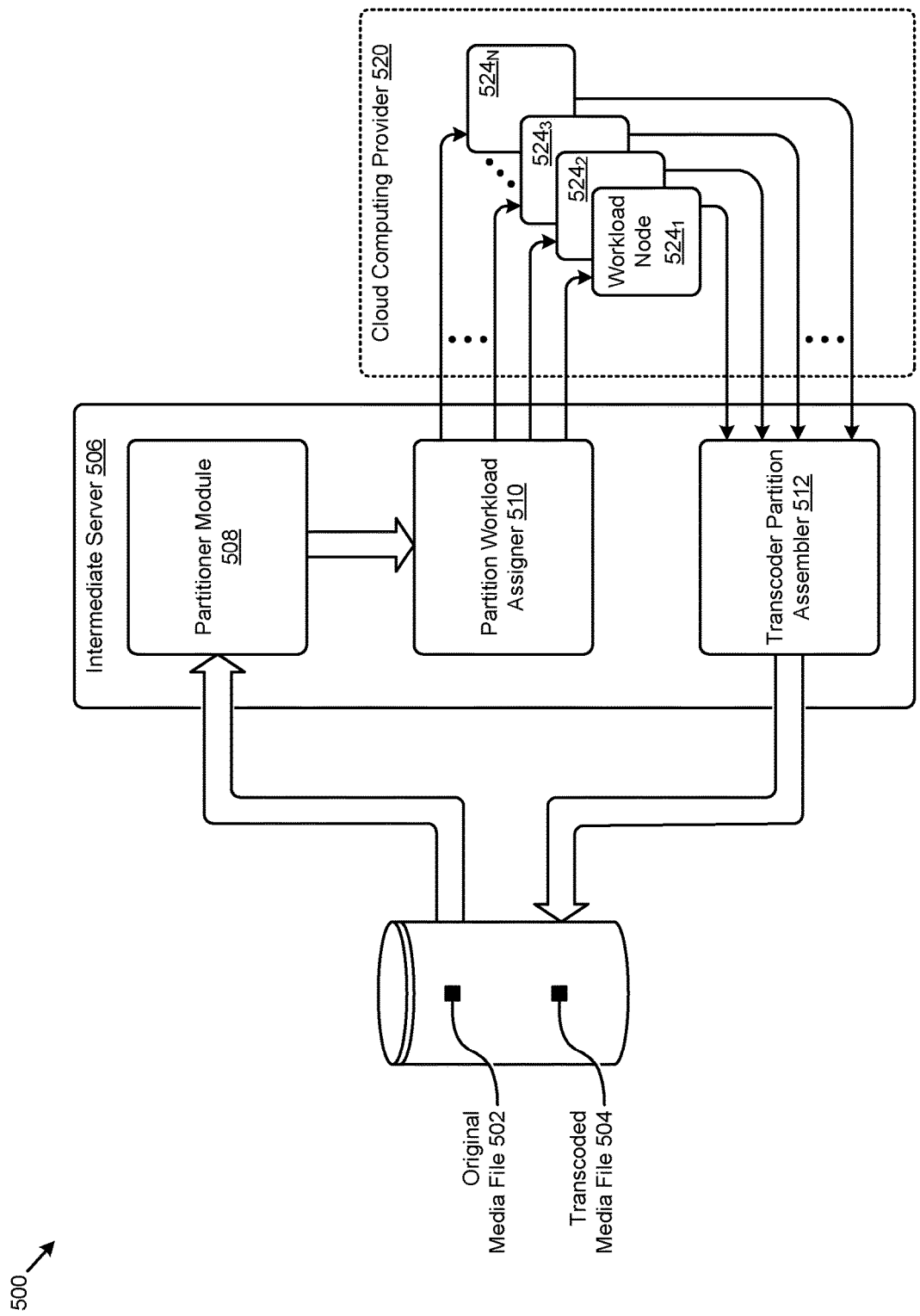
FIG. 5 is a flow diagram illustrating a system for low latency and low defect media file transcoding using optimized partitioning, according to an embodiment.

FIG. 5 is a flow diagram 500 illustrating a system for low latency and low defect media file transcoding using optimized partitioning. As an option, one or more instances of flow diagram 500 or any aspect thereof may be implemented in the context of the architecture and functionality of the embodiments described herein. The flow diagram 500 or any aspect thereof may be implemented in any desired environment.

Flow diagram 500 in FIG. 5 shows one embodiment of representative modules of, and flows through, a system for implementing techniques for low latency and low defect media file transcoding using optimized partitioning. Specifically, an intermediate server 506 can comprise a partitioner module 508, a partition workload assigner 510, and a transcoder partition assembler 512. The intermediate server 506 can further communicate with a cloud-computing provider 520 comprising a plurality of workload nodes (e.g., workload node $524_1$, workload node $524_2$, workload node $524_3$, to workload node $524_N$) to perform various distributed computing and storage operations. Specifically, as pertains to the herein disclosed techniques, the partitioner module 508 of the intermediate server 506 can receive an original media file 502 from a storage facility for transcoding. The partitioner module 508 can analyze the original media file 502 to determine optimized partitions for transcoding (e.g., based in part on the target format or formats and/or available computing resources at cloud computing provider 520). When the partitions and partition boundaries have been determined, the partition workload assigner 510 can assign the respective partitions to the workload nodes at the cloud computing provider 520 to transcode the partitioned original media file segments to respective transcoded media file segments. The transcoder partition assembler 512 can then assemble the transcoded media file segments into a transcoded media video file 504.

Caching

Figure 6A:
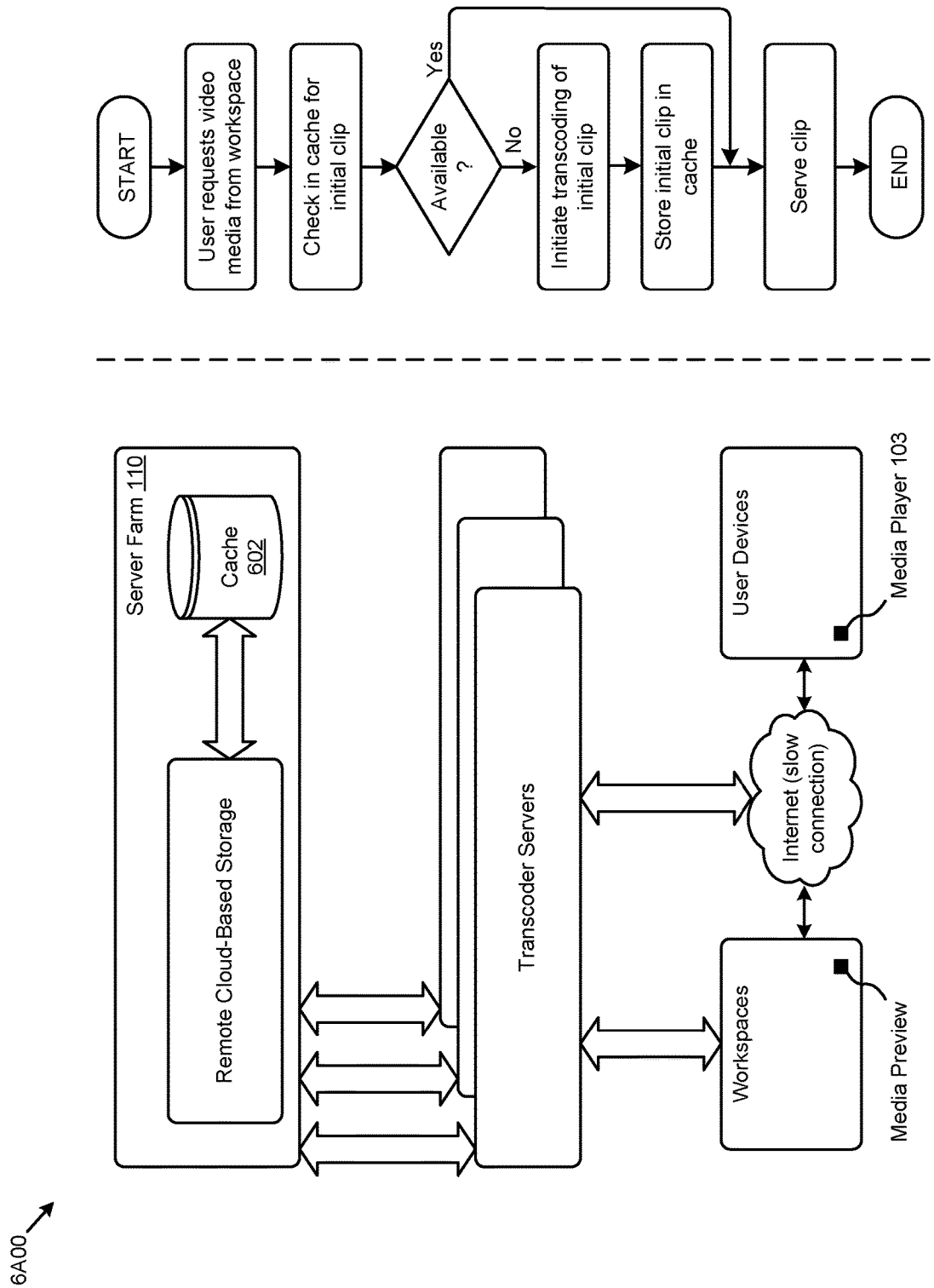
FIG. 6A is a flow diagram illustrating caching of an initial clip as used in systems for low latency and low defect media file transcoding using optimized partitioning, according to an embodiment.

FIG. 6A is a flow diagram 6A00 illustrating caching of an initial clip as used in systems for low latency and low defect media file transcoding using optimized partitioning. Performance of previewing and other delivery of media to a collaborator can be improved by pre-transcoding an initial portion of a media file upon initial posting. For example, and as shown in FIG. 6A, when a user requests to view a media clip (e.g., by selecting from a workspace media preview icon), the system checks in a cache 602 for the presence of the media clip (or portion thereof). If the requested media clip is already available in the cache, then the clip is served. If requested media clip is not yet available in the cache, then at least an initial portion of the media can be transcoded, stored in the cache, and served to the requestor. Various techniques for pre-transcoding an initial portion of a media file are shown and discussed as pertains to FIG. 6B.

Pre-Transcoding

Figure 6B:
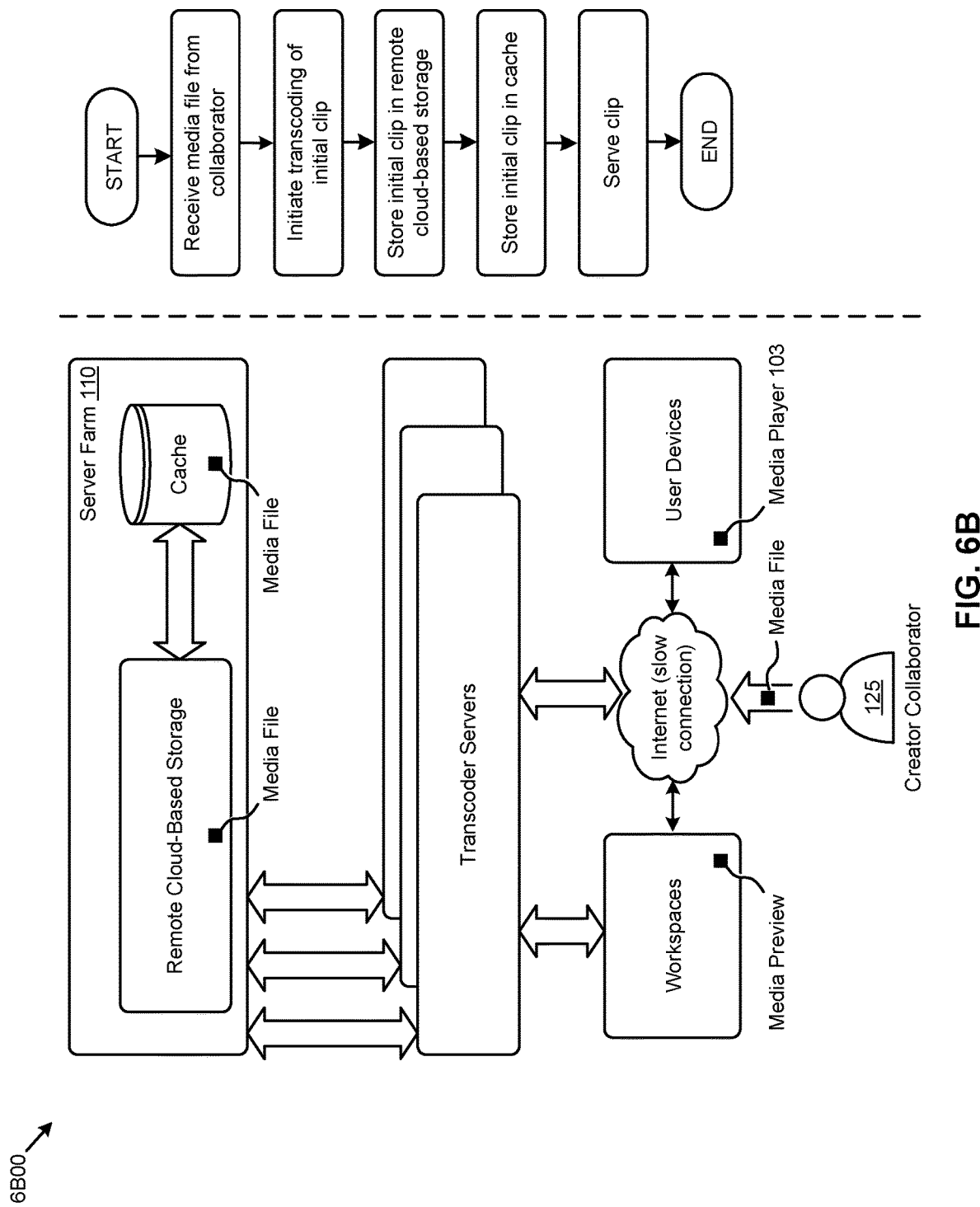
FIG. 6B is a flow diagram illustrating pre-transcoding of an initial clip as used in systems for low latency and low defect media file transcoding using optimized partitioning, according to an embodiment.

FIG. 6B is a flow diagram 6B00 illustrating pre-transcoding of an initial clip as used in systems for low latency and low defect media file transcoding using optimized partitioning. As shown, a creator collaborator 125 might provide a media file for uploading to the remote collaborative cloud-based storage system. At that time, the system can detect that the media file is new to the system and, in accordance with some pre-transcoding techniques, the new file can be pre-processed. Many preprocessing operations can be performed, in particular pre-transcoding of an initial clip. When a collaborator requests to view that media, a preprocessed initial clip of the newly received file is available and can be served to the requestor upon request, resulting in low-latency delivery of the requested media and providing a good user experience. In some embodiments, the media file can be transcoded into multiple initial clips corresponding to various initial lengths (e.g., 10 seconds, 20 seconds, 30 seconds, etc.) and corresponding to various qualities (e.g., 480p, 720p, 1080p, etc.).

Frame-by-Frame Delivery Using a Delivery Pipeline

Figure 6C:
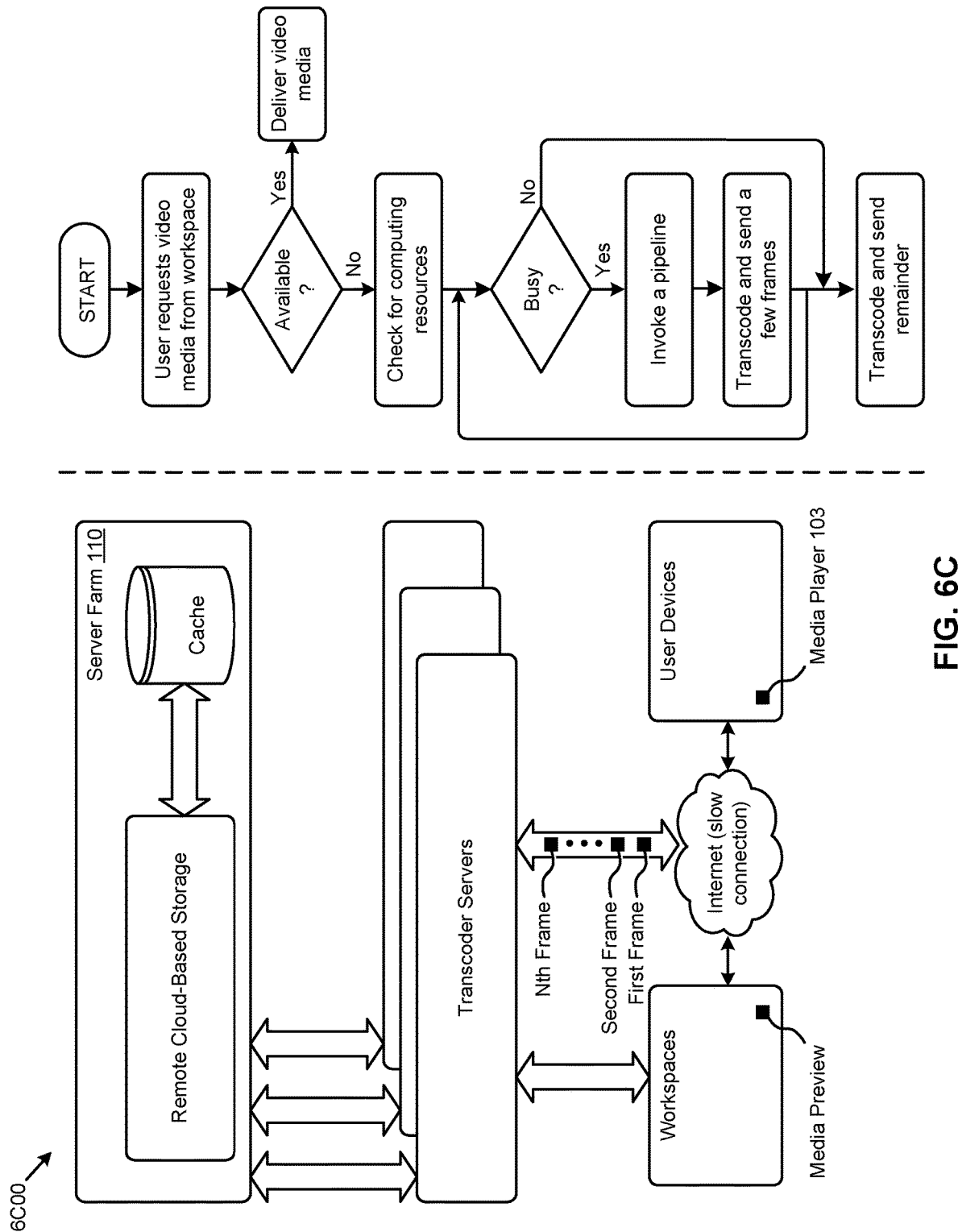
FIG. 6C is a flow diagram illustrating frame-by-frame delivery of a video clip as used in systems for low latency and low defect media file transcoding using optimized partitioning, according to an embodiment.

FIG. 6C is a flow diagram 6C00 illustrating frame-by-frame delivery of a video clip as used in systems for low latency and low defect media file transcoding using optimized partitioning. In some cases, an initial transcoded clip or other requested transcoded clip might not be pre-transcoded (e.g., might not yet be stored in the cache, and might not be stored in the remote collaborative cloud-based storage system). For example, if the transcoder needs to send a chunk to the client but does not have the chunk transcoded, it will start the transcoding operation for that chunk and, as each frame is transcoded, send the frame down to the client, keeping the connection open for subsequent frames. If the transcoder does have the chunk already transcoded (e.g., because it is running with more resources than it needs and is ahead in the transcoding operation than the client is in the viewing operation), then it simply sends the entire chunk down at once (e.g., without using a frame-by-frame pipeline).

In some situations a low latency preview can be facilitated by transcoding a very small portion for initial deliver (e.g., see the technique of FIG. 4B). In other cases, such as when sufficient computing resources needed to transcode an entire initial clip cannot be reserved, then a technique to establishing a frame-by-frame pipeline for transcoding and delivery can be employed. When sufficient computing resources needed to transcode become available, the frame-by-frame pipeline can be flushed, and other transcoding and delivery techniques can be pursued.

Frame-by-Frame Delivery Using Automatic Pre-Generation of a Playlist

FIG. 6D1 is a flow diagram illustrating playlist generation from a video clip as used in systems for low latency and low defect media file transcoding using optimized partitioning. In many situations, a playlist (e.g., an HLS playlist) or manifest (e.g., a DASH manifest) is delivered before delivery of a media clip or portion thereof. In many cases it is felicitous to pre-generate a playlist or manifest upon receipt of a request to access (e.g., watch) a media file. The requester can see various characteristics of the entire media file, and a media player can present navigation controls that are substantially accurate vis-à-vis the entire media file. In some cases many different sized clips, possibly using different qualities of video, can be delivered. In some such cases the timecode of the different clips is corrected (see FIG. 6D4, below).

Generation of URLs Used for Retrieval of Media Clips

FIG. 6D2 is a flow diagram illustrating generation of URLs for video clips as used in systems for low latency and low defect media file transcoding using optimized partitioning. Generating a playlist or manifest for a clip or series of clips involves relating a time or time range with a media file. Strictly as an example, a playlist corresponding to a series of successively larger chunks (e.g., such as discussed in the foregoing FIG. 4B) can be determined as transcoding proceeds through the original media file. The playlist can refer to the initial media file location (e.g., by URL) for immediate playback, and a playlist can identify to the successively larger clips by referring to the media file location of respective successively larger clips. Multiple playlists can be generated upon presentation of a media file, and the resulting playlists or manifests can be stored or cached for fast retrieval.

Generation of Stateful URLs Used for Retrieval of Media Clips

FIG. 6D3 is a flow diagram illustrating generation of URLs for video clips as used in systems for low latency and low defect media file transcoding using optimized partitioning. Generating a playlist or manifest for a clip or series of clips involves relating a time or time range with a media file. Strictly as an example, a playlist corresponding to a series of successively larger chunks (e.g., such as discussed in the foregoing FIG. 4B) can be determined as transcoding proceeds through the original media file. As shown, the processing proceeds as follows: (1) a user requests video media from workspace, (2) the video media metadata is retrieved, and (3) a playlist is generated that contains state-encoded URLs.

In exemplary embodiments, there is one URL generated for each chunk in the playlist, and each URL (e.g., a state-encoded URL entry) that is generated corresponds to an independent transcoding job for that specific chunk. When the URL is accessed by the player, such as after the player reads the playlist file and requests a specific chunk, the state-encoding in the URL pertaining to that chunk is communicates state variables (e.g., variable values) to the transcoding server, which then operates using the state variables and other encoded information necessary to provide the appropriate transcoded chunk. The transcoded chunk data is then delivered to the requesting client. An example of a stateful URL is:

"http://transcode-001.streem.com/
1080.ts?start=20&chunkDuration=10&totalDuration=
120&orientation=180&mediaId=184719719371&
userId=38205818491&jobId=5112485"

The URL itself comprises information delivered to the transcoder. In the example above, the start location (e.g., "start=20"), the chunk duration (e.g., "chunkDuration=10"), and other information can be known by the transcoder, merely by receiving and parsing the stateful URL.

Timecode Correction Techniques to Compensate for Variable Communication Channels FIG. 6D4 is a flow diagram illustrating timecode correction techniques used when transcoding or delivering video clips to viewers as used in systems for low latency and low defect media file transcoding using optimized partitioning. As heretofore described, the environment in which a video clip can be served might vary widely depending on the situation (e.g., serving to a client with a hardline Internet connection, serving to a mobile device over a wireless channel, etc.). Moreover, the environment in a particular situation can vary in real-time. For example, the bit rate available to and from a mobile device might vary substantially while the mobile device user traverses through between cellular towers. More generally, many variations in the communication fabric to and from a user device can occur at any time. Various techniques ameliorate this situation by selecting a next clip to deliver to a mobile device where the selected next clip is selected on the basis of determined characteristics of the available communication channels. For example, during periods where the communication channel is only able to provide (for example) 500 Kbps of bandwidth, a relatively low quality of video (e.g., 480p) can be delivered. When the communication channel improves so as to be able to provide (for example) higher bandwidth, then a relatively higher quality of video (e.g., 1080p) can be delivered to the viewer. Variations of quality vis-à-vis available bandwidth can occur dynamically over time, and any time duration for re-measuring available bandwidth can be relatively shorter or relatively longer. One artifact of such dynamic selection of a particular quality of a video clip is that the timecode of the next delivered clip needs to be corrected, depending on the selected quality. In particular, the metadata of the clip has to be compared with the playlist so that the playlist will still serve for navigation (e.g., fast forward, rewind, etc.) purposes. Further, absent timecode correction, a succession of chunks exhibit artifacts and glitches (e.g., image freezing, skipping around, missing frames, etc.). In exemplary embodiments, transcoding is performed "on-the-fly" using a "dynamic transcoder". A dynamic transcoder starts and stops frequently based on incoming requests. In some implementations, the starting and stopping of the transcoder resets the timecode of the chunks it generates. One or more timecode correction techniques are applied to make each chunk indistinguishable from a chunk that had been made in a single continuous transcoding job.

Strictly as one example, when a transcoding job is interrupted, a timecode correction is needed. A transcoding job might be interrupted whenever a request for a chunk that the transcoder does not have transcoded at that time is received. Such a condition can occur when the client requests a different quality than the previous chunk and/or when the client requests a chunk that is determined to be a forward chunk (e.g., a "seek") in the video rather than a next chunk as would be received during continuous playback of the video.

Access Techniques Using a Virtual File System

Figure 6E:
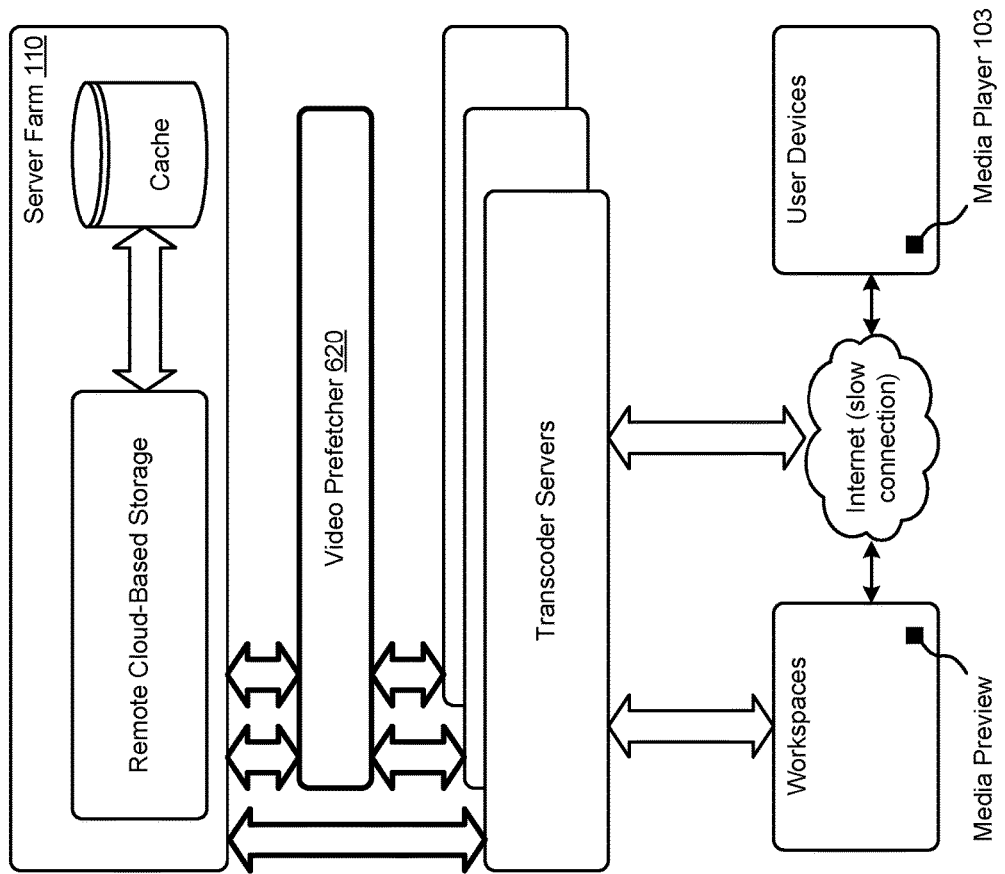
FIG. 6E is a flow diagram illustrating techniques for accessing media files through a custom virtual file system as used when delivering video clips to collaborators, according to an embodiment.

FIG. 6E is a flow diagram 6E00 illustrating techniques for accessing media files through a custom virtual file system as used when delivering video clips to collaborators. In certain situations, the remote collaborative cloud-based storage systems rely on a particular file system (e.g., NTFS, CIFS, etc.), and in some situations, the characteristics of such a particular file system might not map conveniently to the functional requirements of a transcoding and delivery service. One technique to ameliorate differences between the functional requirements of a transcoding and delivery service and a back-end file system is to provide a custom virtual file system, which can be used as a video prefetcher 620. The video prefetcher is used for various purposes, including:

1. Listing the available video files on the user's cloud remote account. The file listing presents actual, readily available files so as to eliminate or reduce the need to write custom code to interact with the APIs of the cloud provider.

2. Handling the downloading of video file content (e.g., frames, bytes, etc.).
3. Prefetching frames or bytes of the video file that are most likely to be accessed in the near future by the transcoder. This reduces network load by reducing or eliminating the need to fetch data every time the transcoder needs new portions of the video file. As such, throughput and latency are greatly improved.
4. Providing a local repository (e.g., a cache) of the video file that is being requested so that subsequent accesses to the same part of the video file by the transcoder can be retrieved from the local repository rather than from cloud-based storage.

The video prefetcher 620 serves to fetch the predicted next parts of the original video that the transcoder is predicted to process soon. This improves transcoding throughput by pipelining the downloading and the transcoding into adjacent pipeline phases. Further, the video prefetcher can be configured to cache recently downloaded videos so that the transcoder doesn't need to re-download the original when transcoding into another quality level or when re-transcoding for another user. In exemplary embodiments, the video prefetcher provides an abstraction layer to other element of the system, thus allowing the transcoder to remain independent from all network requests. The transcoder is relieved of tasks and operations pertaining to downloading, authentication, identifying and transferring metadata, etc.

ADDITIONAL EMBODIMENTS OF THE DISCLOSURE

Additional Practical Application Examples

Figure 7:
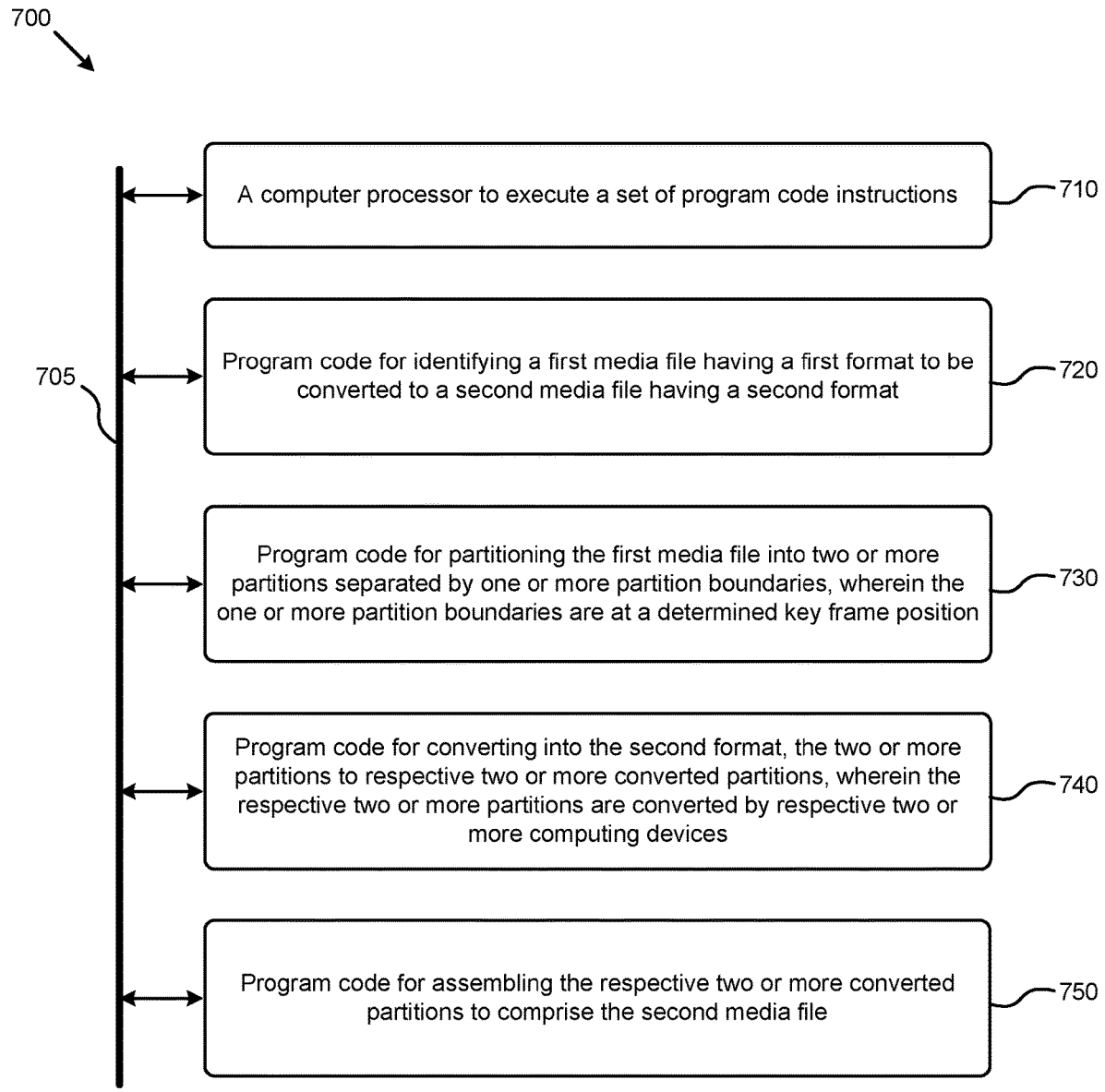
FIG. 7 depicts a system as an arrangement of computing modules that are interconnected so as to operate cooperatively to implement certain of the herein-disclosed embodiments.

FIG. 7 depicts a system 700 as an arrangement of computing modules that are interconnected so as to operate cooperatively to implement certain of the herein-disclosed embodiments. The partitioning of system 700 is merely illustrative and other partitions are possible.

FIG. 7 depicts a block diagram of a system to perform certain functions of a computer system. As an option, the system 700 may be implemented in the context of the architecture and functionality of the embodiments described herein. Of course, however, the system 700 or any operation therein may be carried out in any desired environment. The system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims. The shown embodiment implements a portion of a computer system, presented as system 700, comprising a computer processor to execute a set of program code instructions (see module 710) and modules for accessing memory to hold program code instructions to perform: identifying a first media file having a first format to be converted to a second media file having a second format (see module 720); partitioning the first media file into two or more partitions separated by one or more partition boundaries, wherein the one or more partition boundaries are at a determined key frame position (see module 730); converting into the second format, the two or more partitions to respective two or more converted partitions, wherein the respective two or more partitions are converted by respective two or more computing devices (see module 740); and assembling the respective two or more converted partitions to comprise the second media file (see module 750).

Variations include:
Variations where the determined key frame position is a closest key frame location to a respective one of the partition boundaries.
Variations that comprise storing at least a portion of the second media file into a cache.
Variations that comprise retrieving at least a portion of the second media file from a cache.
Variations that comprise delivering at least a portion of the second media file to a requestor to be viewed on a media player.
Variations that comprise assigning of the two or more partitions to the respective two or more computing devices.
Variations where the two or more partitions are characterized by a set of progressively increasing durations.
Variations where the two or more partitions are characterized by a set of progressively decreasing durations.
Variations where the two or more partitions are characterized by a set of progressively increasing quality levels.
Variations where the partitioning is based at least in part on a total computing resource availability.
Variations where the partitioning is based at least in part on at least one of, the first format and the second format.
Variations where the respective two or more computing devices comprise a cloud-based computing system.
Variations where at least one of the respective two or more converted partitions comprise an attribute dataset.
Variations where the attribute dataset is at least one of, an atom, a movie atom, and a moov atom.
Variations where steps for converting into the second format comprise a timecode correction.
Variations that comprise generating a playlist based at least in part on the second media file.
Variations where at least some playlist entries comprise a state-encoded URL.
Variations where the respective two or more partitions are selected based on a length.
Variations where at least one of the respective two or more partitions are stored before an assembling step.
Variations where at least one of the respective two or more partitions corresponds to a beginning portion of the first media file.

System Architecture Overview

Additional System Architecture Examples

Figure 8A:
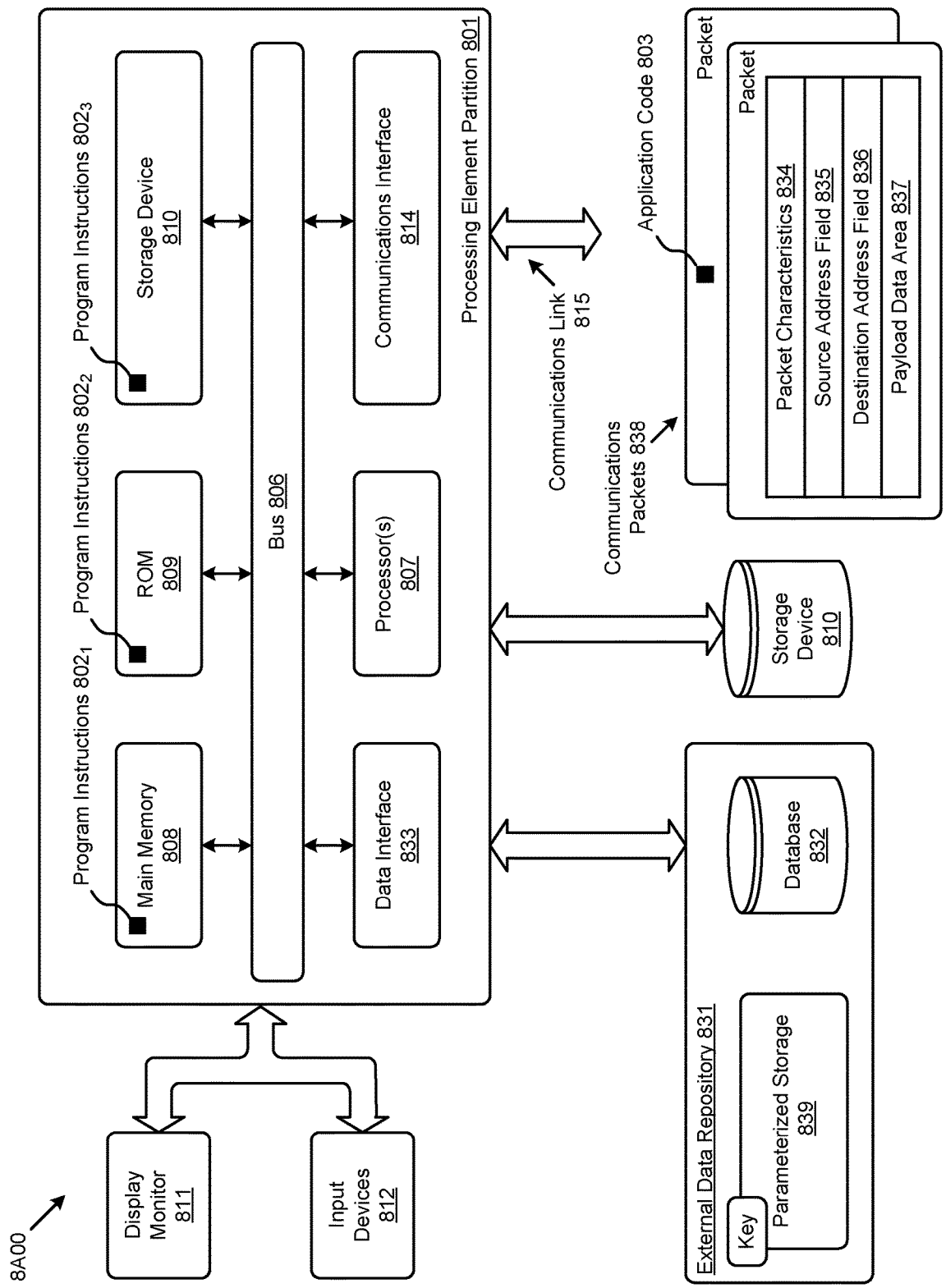
FIG. 8A and FIG. 8B depict exemplary architectures of components suitable for implementing embodiments of the present disclosure, and/or for use in the herein-described environments.

FIG. 8A depicts a block diagram of an instance of a computer system 8A00 suitable for implementing embodiments of the present disclosure. Computer system 8A00 includes a bus 806 or other communication mechanism for communicating information. The bus interconnects subsystems and devices such as a CPU, or a multi-core CPU (e.g., processor 807), a system memory (e.g., main memory 808, or an area of random access memory RAM), a non-volatile storage device or area (e.g., ROM 809), an internal or external storage device 810 (e.g., magnetic or optical), a data interface 833, a communications interface 814 (e.g., PHY, MAC, Ethernet interface, modem, etc.). The aforementioned components are shown within processing element partition 801, however other partitions are possible. The shown computer system 8A00 further comprises a display 811 (e.g., CRT or LCD), various input devices 812 (e.g., keyboard, cursor control), and an external data repository 831.

According to an embodiment of the disclosure, computer system 8A00 performs specific operations by processor 807 executing one or more sequences of one or more program code instructions contained in a memory. Such instructions (e.g., program instructions 8021, program instructions 8022, program instructions 8023, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination therefrom.

According to an embodiment of the disclosure, computer system 8A00 performs specific networking operations using one or more instances of communications interface 814. Instances of the communications interface 814 may comprise one or more networking ports that are configurable (e.g., pertaining to speed, protocol, physical layer characteristics, media access characteristics, etc.) and any particular instance of the communications interface 814 or port thereto can be configured differently from any other particular instance. Portions of a communication protocol can be carried out in whole or in part by any instance of the communications interface 814, and data (e.g., packets, data structures, bit fields, etc.) can be positioned in storage locations within communications interface 814, or within system memory, and such data can be accessed (e.g., using random access addressing, or using direct memory access DMA, etc.) by devices such as processor 807.

The communications link 815 can be configured to transmit (e.g., send, receive, signal, etc.) communications packets 838 comprising any organization of data items. The data items can comprise a payload data area 837, a destination address 836 (e.g., a destination IP address), a source address 835 (e.g., a source IP address), and can include various encodings or formatting of bit fields to populate the shown packet characteristics 834. In some cases the packet characteristics include a version identifier, a packet or payload length, a traffic class, a flow label, etc. In some cases the payload data area 837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to processor 807 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 831, which in turn can be formatted into any one or more storage areas, and which can comprise parameterized storage 839 accessible by a key (e.g., filename, table name, block address, offset address, etc.).

Execution of the sequences of instructions to practice certain embodiments of the disclosure are performed by a single instance of the computer system 8A00. According to certain embodiments of the disclosure, two or more instances of computer system 8A00 coupled by a communications link 815 (e.g., LAN, PTSN, or wireless network) may perform the sequence of instructions required to practice embodiments of the disclosure using two or more instances of components of computer system 8A00.

The computer system 8A00 may transmit and receive messages such as data and/or instructions organized into a data structure (e.g., communications packets 838). The data structure can include program instructions (e.g., application code 803), communicated through communications link 815 and communications interface 814. Received program code may be executed by processor 807 as it is received and/or stored in the shown storage device or in or upon any other non-volatile storage for later execution. Computer system 8A00 may communicate through a data interface 833 to a database 832 on an external data repository 831. Data items in a database can be accessed using a primary key (e.g., a relational database primary key).

The processing element partition 801 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a processor 807. Some embodiments include one or more special-purpose hardware components (e.g., power control, logic, sensors, transducers, etc.). A module may include one or more state machines and/or combinational logic used to implement or facilitate the performance characteristics of low latency and low defect media file transcoding using optimized partitioning.

Various implementations of the database 832 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of low latency and low defect media file transcoding using optimized partitioning). Such files or records can be brought into and/or stored in volatile or non-volatile memory.

Figure 8B:
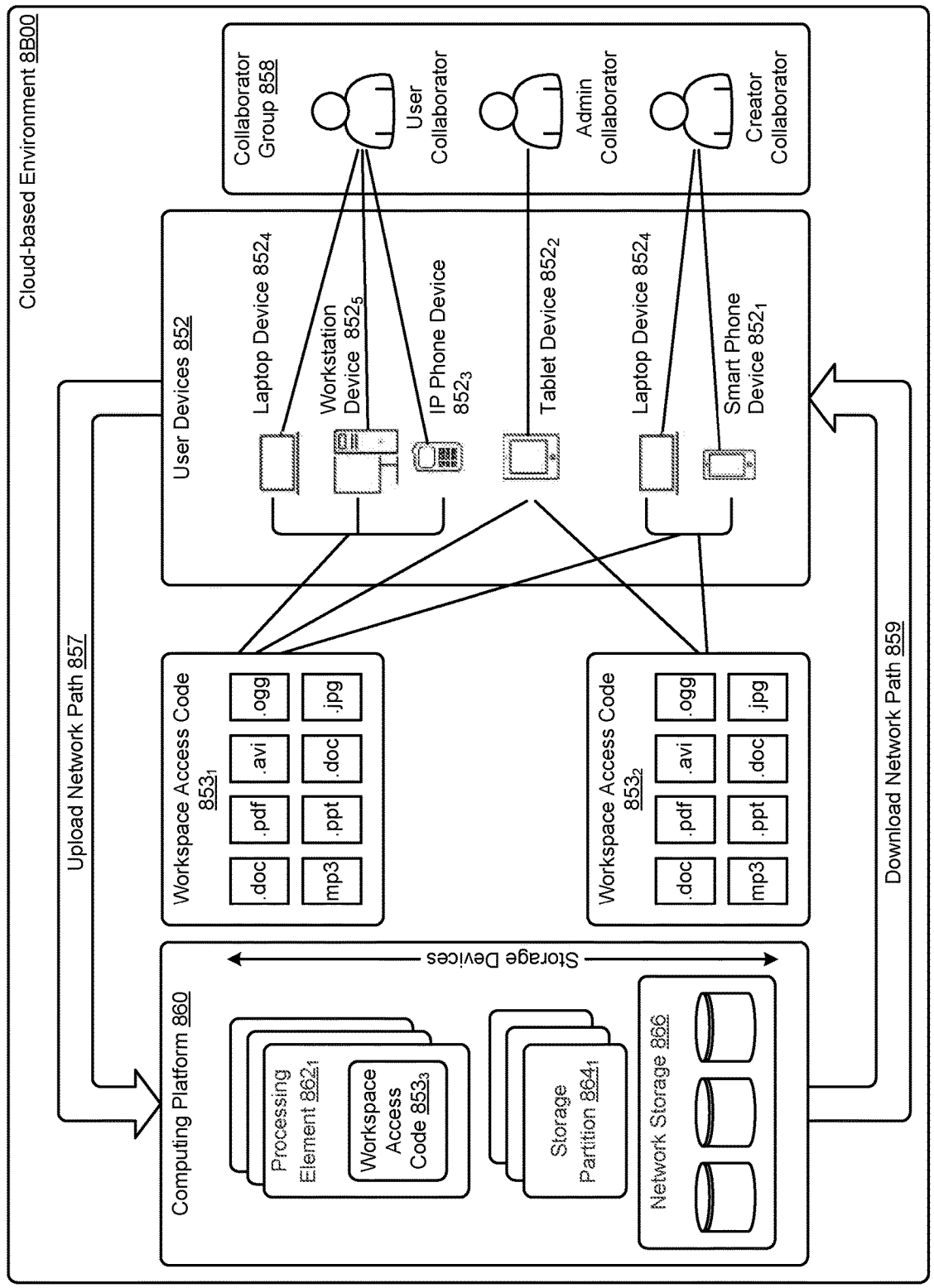

FIG. 8B depicts a block diagram of an instance of a cloud-based environment 8B00. Such a cloud-based environment supports access to workspaces through the execution of workspace access code (e.g., workspace access code 8531 and workspace access code 8532. Workspace access code can be executed on any of the shown user devices 852 (e.g., laptop device 8524, workstation device 8525, IP phone device 8523, tablet device 8522, smart phone device 8521, etc.). A group of users can form a collaborator group 858, and a collaborator group can be comprised of any types or roles of users. For example, and as shown, a collaborator group can comprise a user collaborator, an administrator collaborator, a creator collaborator, etc. Any user can use any one or more of the user devices, and such user devices can be operated concurrently to provide multiple concurrent sessions and/or other techniques to access workspaces through the workspace access code.

A portion of workspace access code can reside in and be executed on any user device. In addition, a portion of the workspace access code can reside in and be executed on any computing platform (e.g., computing platform 860), including in a middleware setting. As shown, a portion of the workspace access code (e.g., workspace access code $853_3$) resides in and can be executed on one or more processing elements (e.g., processing element $862_1$). The workspace access code can interface with storage devices such the shown networked storage 866. Storage of workspaces and/or any constituent files or objects, and/or any other code or scripts or data can be stored in any one or more storage partitions (e.g., storage partition $864_1$). In some environments, a processing element includes forms of storage, such as RAM and/or ROM and/or FLASH, and/or other forms of volatile and non-volatile storage.

A stored workspace can be populated via an upload (e.g., an upload from a user device to a processing element over an upload network path 857). One or more constituents of a stored workspace can be delivered to a particular user and/or shared with other particular users via a download (e.g., a download from a processing element to a user device over a download network path 859).

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A method comprising:
identifying a storage system where a first media file is stored in a backend file system; and
implementing a virtual file system to deliver the first media file to a user device from the backend file system of the storage system, wherein
the storage system comprises a content server and a plurality of transcoder servers and stores a plurality of media files including the first media file accessible by the content server, and the plurality of transcoder servers transcoding data into respective, different formats,
the virtual file system forms a video prefetcher to fetch at least a portion of the first media file from the backend file system of the storage system,
the virtual file system is implemented to interface with at least the content server and the plurality of transcoder servers in the storage system having the backend file system that has a different file system than a file system of the virtual file system,
a transcoder server is selected from the plurality of transcoder servers in the storage system based at least in part a difference between the storage system and a transcoding service for the first media file,
the first media file is partitioned into two or more partitions separated by one or more partition boundaries and the one or more partition boundaries are at a determined key frame position,
the virtual file system prefetches a partition of the two or more partitions of the first media file that are is predicted to be accessed by a transcoder, and
the virtual file system transmits at least the partition of the two or more partitions to the transcoder server that transcodes the at least one partition into at least one prefetched, transcoded partition.

2. The method of claim 1, wherein the first media file corresponds to a first format to be converted to a second media file having a second format, the first media file is converted into the second format where the two or more partitions correspond to respective two or more converted partitions, and the respective two or more converted partitions are assembled to comprise the second media file.

3. The method of claim 1, wherein the determined key frame position is a closest key frame location to a respective one of the one or more partition boundaries.

4. The method of claim 1, wherein the two or more partitions that are assembled into a second media file are characterized by a set of progressively increasing quality levels, and timecode correction is performed during transcoding a subsequent partition of the two or more partitions or during delivering a timecode-corrected subsequent partition of the subsequent partition.

5. The method of claim 1, wherein a file listing of available media files is provided using the virtual file system so that custom code is not needed at the user device to interact with an API at the storage system.

6. The method of claim 1, further comprising repeatedly receiving a plurality of requests for data of the first media file from a client and initiating display of data of the first media file after transmitting a first amount of the data to the client, rather than immediately queuing the data for display, wherein network load is reduced by prefetching the second instance of the partition of the first media file so that data is not fetched every time the transcoder needs a new portion of the first media file.

7. The method of claim 1, implementing the virtual file system to deliver the first media file comprising:
identifying a first instance from multiple instances of a partition of the two or more partitions of the first media file and a first timecode for the first instance;
predicting that a second instance of the multiple instances is to be requested by the user device and a second timecode for the second instance, the second instance comprises a second size that is different from a first size of the first instance of the partition; and reducing or eliminating a playback artifact or playback glitch at least by correcting the second timecode for the second instance so that the second instance appears to be indistinguishable from the first instance of the second partition that had been produced from a single transcoding process, wherein the virtual file system provides a cache for recently downloaded content.

8. A non-transitory computer readable medium, embodied in a non-transitory computer readable medium, the non-transitory computer readable medium having stored thereon a sequence of instructions which, when stored in memory and executed by a processor causes the processor to perform a set of acts, the set of acts comprising:
identifying a storage system where a first media file is stored in a backend file system; and
implementing a virtual file system to deliver the first media file to a user device from the backend file system of the storage system, wherein
the storage system comprises a content server and a plurality of transcoder servers and stores a plurality of media files including the first media file accessible by the content server, and the plurality of transcoder servers transcoding data into respective, different formats,
the virtual file system forms a video prefetcher to fetch at least a portion of the first media file from the backend file system of the storage system,
the virtual file system is implemented to interface with at least the content server and the plurality of transcoder servers in the storage system having the backend file system that has a different file system than a file system of the virtual file system,
a transcoder server is selected from the plurality of transcoder servers in the storage system based at least in part a difference between the storage system and a transcoding service for the first media file,
the first media file is partitioned into two or more partitions separated by one or more partition boundaries and the one or more partition boundaries are at a determined key frame position,
the virtual file system prefetches a partition of the two or more partitions of the first media file that is predicted to be accessed by a transcoder, and
the virtual file system transmits at least the partition of the two or more partitions to the transcoder server that transcodes the at least one partition into at least one prefetched, transcoded partition.

9. The non-transitory computer readable medium of claim 8, wherein the first media file corresponds to a first format to be converted to a second media file having a second format, the first media file is converted into the second format where the two or more partitions correspond to respective two or more converted partitions, and the respective two or more converted partitions are assembled to comprise the second media file.

10. The non-transitory computer readable medium of claim 8, wherein the determined key frame position is a closest key frame location to a respective one of the one or more partition boundaries.

11. The non-transitory computer readable medium of claim 8, wherein the two or more partitions that are assembled into a second media file are characterized by a set of progressively increasing quality levels, and timecode correction is performed during transcoding a subsequent partition of the two or more partitions or during delivering a timecode-corrected subsequent partition of the subsequent partition.

12. The non-transitory computer readable medium of claim 8, wherein a file listing of available media files is provided using the virtual file system so that custom code is not needed at the user device to interact with an API at the storage system.

13. The non-transitory computer readable medium of claim 8, the set of acts further comprising repeatedly receiving a plurality of requests for data of the first media file from a client and initiating display of data of the first media file after transmitting a first amount of the data to the client, rather than immediately queuing the data for display, wherein network load is reduced by prefetching the second instance of the partition of the first media file so that data is not fetched every time the transcoder needs a new portion of the first media file.

14. The non-transitory computer readable medium of claim 8, the set of acts comprising implementing the virtual file system to deliver the first media file further comprising:
identifying a first instance from multiple instances of a partition of the two or more partitions of the first media file and a first timecode for the first instance;
predicting that a second instance of the multiple instances is to be requested by the user device and a second timecode for the second instance, the second instance comprises a second size that is different from a first size of the first instance of the partition; and
reducing or eliminating a playback artifact or playback glitch at least by correcting the second timecode for the second instance so that the second instance appears to be indistinguishable from the first instance of the second partition that had been produced from a single transcoding process, wherein the virtual file system provides a cache for recently downloaded content.

15. A system comprising:
a storage medium having stored thereon a sequence of instructions; and
a processor or processors that execute the instructions to cause the processor or processors to perform a set of acts, the set of acts comprising:
identifying a storage system where a first media file is stored in a backend file system; and
implementing a virtual file system to deliver the first media file to a user device from the backend file system of the storage systems; wherein
the storage system comprises a content server and a plurality of transcoder servers and stores a plurality of media files including the first media file accessible by the content server, and the plurality of transcoder servers transcoding data into respective, different formats,
the virtual file system forms a video prefetcher to fetch at least a portion of the first media file from the backend file system of the storage system,
the virtual file system is implemented to interface with at least the content server and the plurality of transcoder servers in the storage system having the backend file system that has a different file system than a file system of the virtual file system,
a transcoder server is selected from the plurality of transcoder servers in the storage system based at least in part a difference between the storage system and a transcoding service for the first media file,
the first media file is partitioned into two or more partitions separated by one or more partition boundaries and the one or more partition boundaries are at a determined key frame position, the virtual file system prefetches a partition of the two or more partitions of the first media file that are is predicted to be accessed by a transcoder, and the virtual file system transmits at least the partition of the two or more partitions to the transcoder server that transcodes the at least one partition into at least one prefetched, transcoded partition.

16. The system of claim 15, wherein the first media file corresponds to a first format to be converted to a second media file having a second format, the first media file is converted into the second format where the two or more partitions correspond to respective two or more converted partitions, and the respective two or more converted partitions are assembled to comprise the second media file.

17. The system of claim 15, wherein the determined key frame position is a closest key frame location to a respective one of the one or more partition boundaries.

18. The system of claim 15, wherein the two or more partitions that are assembled into a second media file are characterized by a set of progressively increasing quality levels, and timecode correction is performed during transcoding a subsequent partition of the two or more partitions or during delivering a timecode-corrected subsequent partition of the subsequent partition.

19. The system of claim 15, wherein a file listing of available media files is provided using the virtual file system so that custom code is not needed at the user device to interact with an API at the storage system.

20. The system of claim 15, the set of acts further comprising further comprising repeatedly receiving a plurality of requests for data of the first media file from a client and initiating display of data of the first media file after transmitting a first amount of the data to the client, rather than immediately queuing the data for display, wherein network load is reduced by prefetching the partition of the first media file so that data is not fetched every time the transcoder needs a new portion of the first media file.

* * * * *